(12) United States Patent
Riveiro et al.

(10) Patent No.: US 7,970,374 B2
(45) Date of Patent: Jun. 28, 2011

(54) MULTI-WIDEBAND COMMUNICATIONS OVER POWER LINES

(75) Inventors: Juan Carlos Riveiro, Barcelona (ES);
Nils Haken Fouren, Barcelona (ES);
Jonathan Ephraim David Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/770,586

(22) Filed: Apr. 29, 2010

(65) Prior Publication Data

US 2010/0278223 A1 Nov. 4, 2010

Related U.S. Application Data

(63) Continuation-in-part of application No. 11/467,141, filed on Aug. 24, 2006, now Pat. No. 7,899,436.

(30) Foreign Application Priority Data

Oct. 3, 2005 (EP) .................................... 05256179

(51) Int. Cl.
*H04M 9/00* (2006.01)
(52) U.S. Cl. .................... 455/402; 307/2; 307/3; 307/4; 340/538.11; 340/310.11
(58) Field of Classification Search ................. 455/402; 340/538.11, 310.11; 307/2–4
See application file for complete search history.

(56) References Cited

U.S. PATENT DOCUMENTS

| | | | |
|---|---|---|---|
| 2003/0184433 A1* | 10/2003 | Zalitzky et al. | 340/310.06 |
| 2005/0213516 A1* | 9/2005 | Ramirez et al. | 370/254 |
| 2005/0249245 A1* | 11/2005 | Hazani et al. | 370/485 |

* cited by examiner

*Primary Examiner* — Wayne Cai
(74) *Attorney, Agent, or Firm* — Garlick Harrison & Markison; Bruce E. Garlick

(57) ABSTRACT

Systems and methods for communicating over a power line are configured to substantially simultaneously communicate over a plurality of wideband frequency ranges. Signals may be communicated two or from a communication node at two different frequencies simultaneously. These signals may be exchanged with different nodes and/or include independent data. In some embodiments, some of the wideband frequency ranges are above 30 MHz.

18 Claims, 23 Drawing Sheets

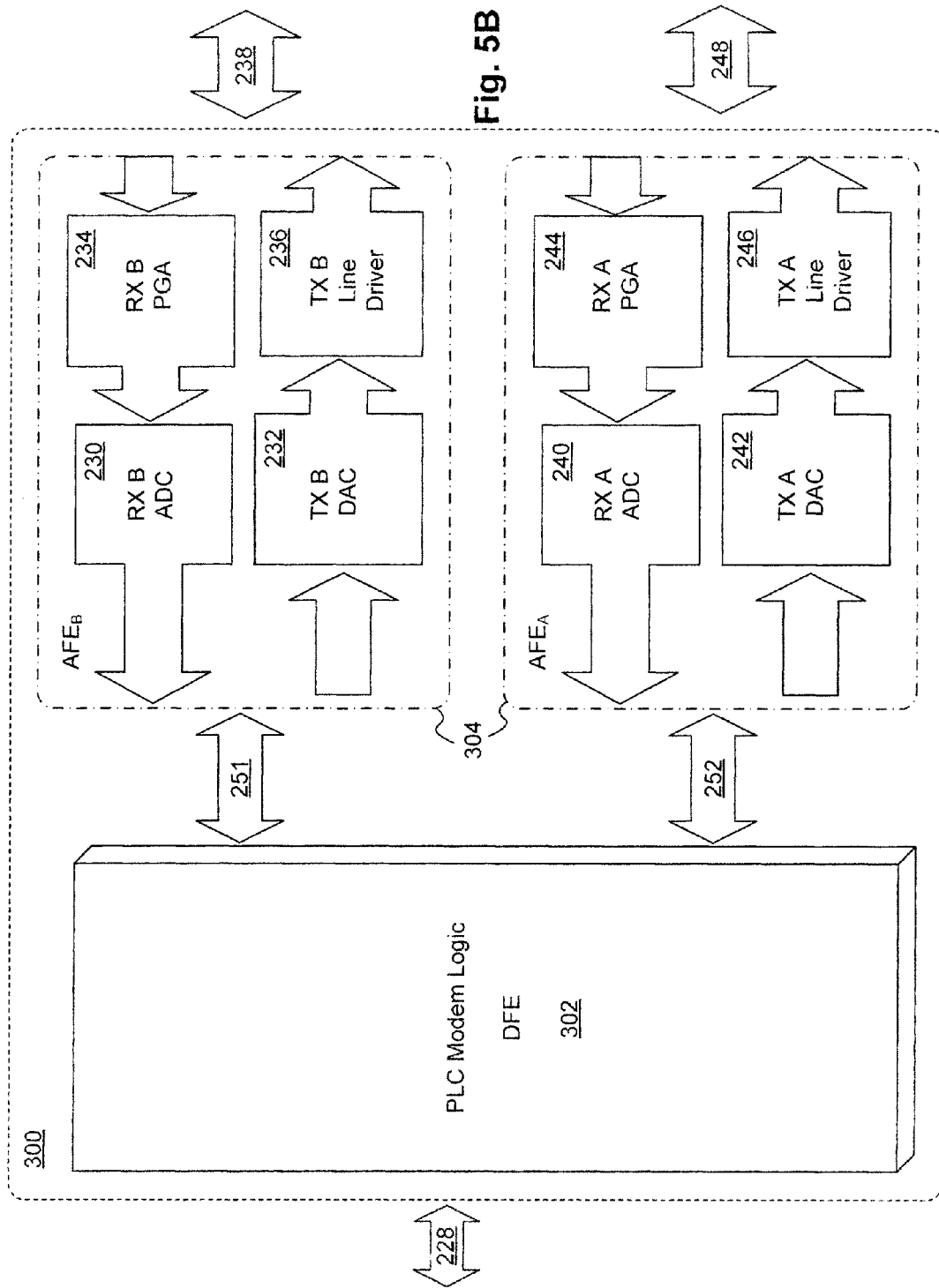

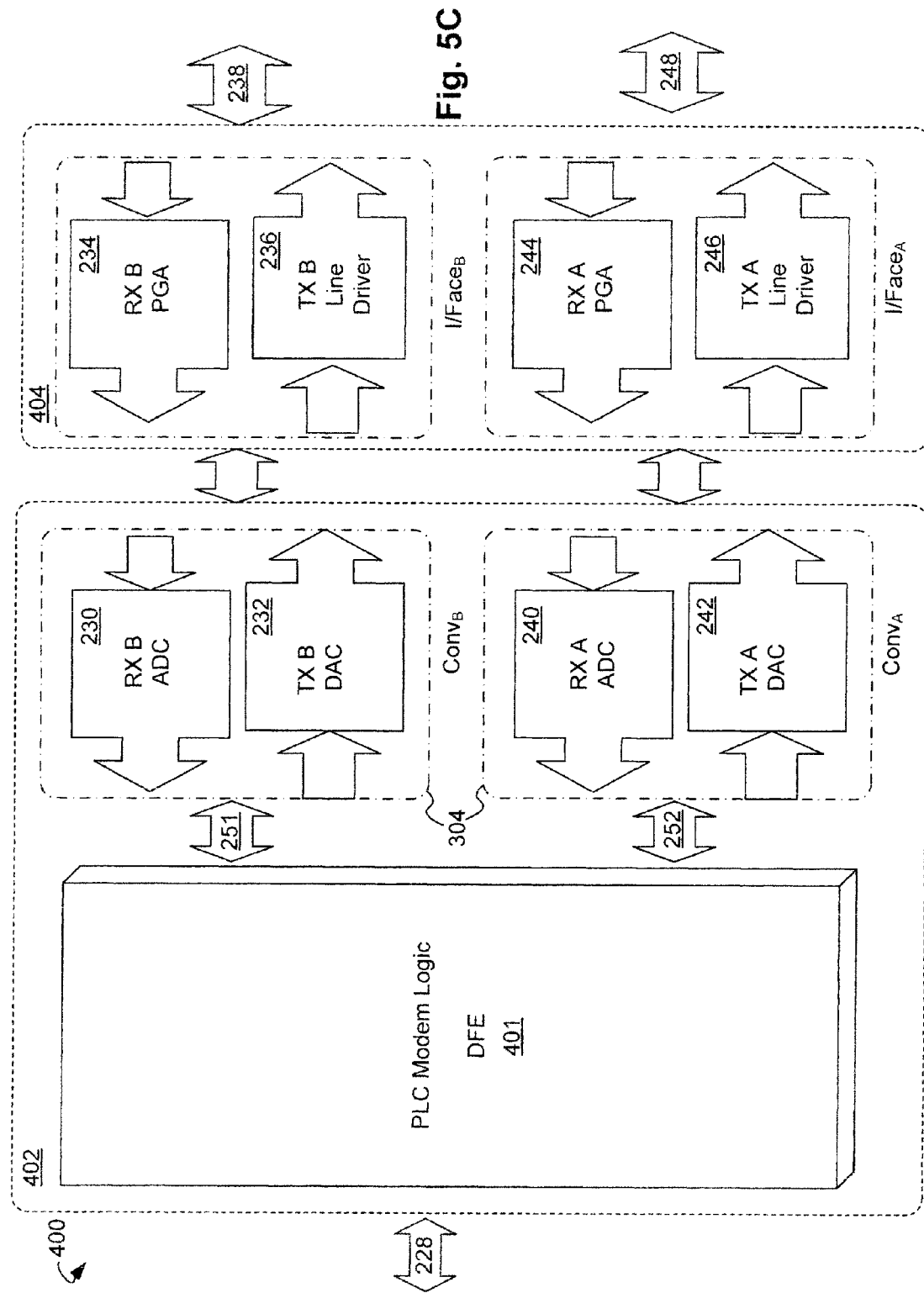

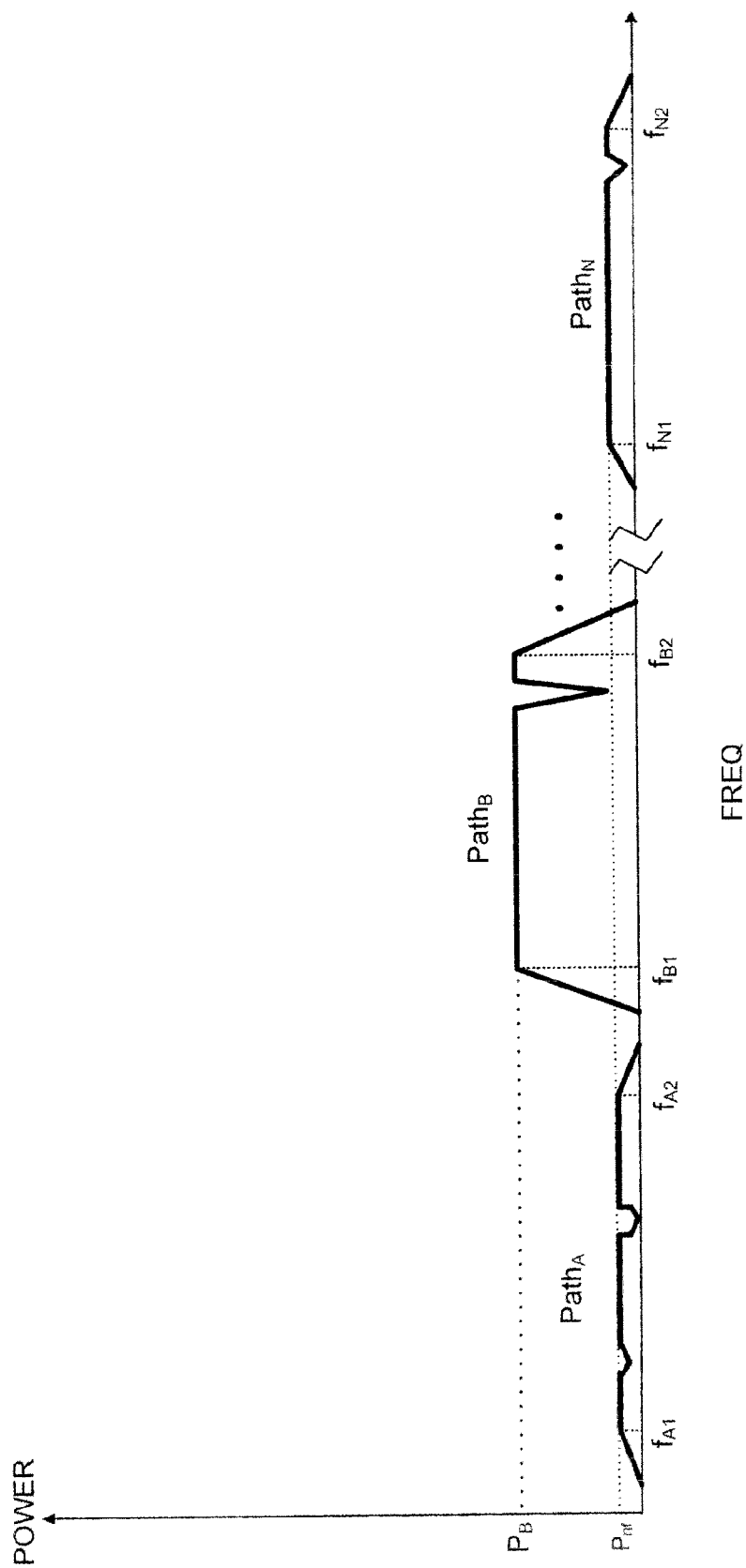

MULTI-WIDEBAND COMMUNICATIONS OVER POWER LINES

CROSS-REFERENCE TO RELATED APPLICATIONS

This application is a Continuation-in-part of U.S. patent application Ser. No. 11/467,141, entitled "Multi-Wideband Communications over Power Lines," filed Aug. 24, 2006 now U.S. Pat. No. 7,899,436 which claims foreign benefit of European Patent Application EP 05 256 179.2, entitled "Powerline Communication Device and Method," filed Oct. 3, 2005. The disclosures of the above two patent applications are incorporated herein by reference. This application is related to U.S. patent application Ser. No. 12/484,754, entitled "Power Line Communication Networks and Methods employing Multiple Widebands," filed Jun. 15, 2009 which is a Continuation of U.S. patent application Ser. No. 11/467,141. This application is also related to U.S. patent application Ser. No. 11/536,539, entitled "Multi-Wideband Communications over Power Lines," filed Sep. 28, 2006 which is a Continuation-in-part of U.S. patent application Ser. No. 11/467,141. This application is further related to U.S. patent application Ser. No. 12/554,440, entitled "Multi-Wideband Communications over Power Lines," filed Sep. 4, 2009 which is a Divisional of U.S. patent application Ser. No. 11/467,141.

BACKGROUND

1. Field of the Invention

The present invention relates to systems and methods for power line communication and in particular, systems and methods for wideband power line communication.

2. Related Art

With the growing use of digital content (e.g. MP3 audio, MPEG4 video and digital photographs) there is a widely recognised need to improve digital communication systems. Power line communication (PLC) is a technology that encodes data in a signal and transmits the signal on existing electricity power lines in a band of frequencies that are not used for supplying electricity. Accordingly, PLC leverages the ubiquity of existing electricity networks to provide extensive network coverage. Furthermore, since PLC enables data to be accessed from conventional power-outlets, no new wiring needs to be installed in a building (or different parts of a building). Accordingly, PLC offers the additional advantage of reduced installation costs.

Referring to FIG. 1, a household 10 typically has a distributed mains wiring system (not shown) consisting of one or more ring mains, several stubs and some distribution back to a junction box 12. For the sake of example, let the household 10 comprise four rooms 14, 16, 18 and 20. Every room 14-20 may have a different number of outlets and other mains connections. For example, room 14 may have only one connection 22, room 16 may have two connections 24, 26, room 18 may have three connections 28, 30, 32 and room 20 may have six connections 34, 36, 38, 40, 42, 44.

Accordingly, there are a variety of distances and paths between different power outlets in the household 10. In particular, the outlets most closely located to each other are those on multi-plug strips, and the outlets furthest away from each other are those on the ends of stubs of different ring mains (e.g. power outlets in the garden shed and the attic). Communication between these furthest outlets typically pass through the junction box 12. Nonetheless, the majority of outlets associated with a particular application (e.g. Home Cinema) are normally located relatively close together.

Because the channel capacity of a power line and connectors attenuates according to, amongst other features, the frequency of a transmitted signal, current generation PLC systems have been developed to transmit signals at relatively low frequencies (i.e. below 30 MHz) and thereby obtain suitable transmission distances. However, the use of such low transmission frequencies limits the maximum data throughput obtainable by PLC systems.

The processes of receiving analog signals and injecting modulated signals are treated differently by different PLC standards. Current approaches perform some analog conditioning to the signal-path (e.g. low-pass filtering for anti-aliasing or smoothing, or AC coupling to remove the low-frequency [<<1 KHz] high voltage content of the electricity mains). However, there are no analog systems available for combining two or more broadband PLC technologies that can work simultaneously.

A number of power line communication standards have been defined. These include the Homeplug 1.0/1.1 standards, the Homeplug AV standard, the CEPCA standard, the Digital Home Standard, IEEE 1901, and ITU-T G.9960.

In common with most communication systems, one of the main problems with prior art PLC systems is obtaining high throughput and wide coverage at reasonable implementation cost, whilst maintaining compatibility with existing technologies. Although a few PLC systems that provide transmission rates of hundreds of megabits per second are currently on the market, these systems have high implementation costs as they employ high bps/Hz modulation schemes (i.e. approximately 10 bps/Hz) which require high accuracy data converters, extremely linear interface electronics and increase the cost of the digital implementation due to the computational complexity of the modulation.

There is, therefore, a need for improved PLC systems that overcome the above and other problems.

SUMMARY

Various embodiments include systems and methods of communicating over a power line by simultaneously sending and/or receiving data over a plurality of wideband frequency ranges. Various embodiments include a power line communication network comprising at least one power line communication device configured to use a plurality of wideband frequency ranges.

Some embodiments include a system for communicating over a power line comprising a device for communicating over a power line, systems for connecting to the power line, and systems for transmitting data from the device to appropriate applications or transmitting data from the applications to the device.

In some embodiments, the power line communication device is configured to improve the throughput/coverage/cost performance trade-off of a power line network, when compared with current-generation PLC networks, by spreading the transmission of data into a plurality of independent wideband frequency bands that can be operated simultaneously and independently.

Furthermore, the power line communication device also optionally facilitates inter-operability by using one or more of the frequency bands to facilitate communication with nodes employing previous power line technologies. In this way, the power line communication device provides a way of creating a scalable implementation of a network where nodes of previous technologies work, without loss of performance, together with new-generation power line technologies.

More particularly, the power line communication device can enable the use of frequencies above 30 MHz whilst maintaining compatibility with current worldwide EMC regulations and standards. This is achieved by using a signal of frequency less than 30 MHz (as currently used by the power line standard and/or regulations) and at least one other signal of frequency greater than 30 MHz without compromising the performance of any of the signals due to interference.

The result is a new PLC system that facilitates interoperability with a pre-existing power line communication technology within a wideband (currently in the frequency range of 1 MHz to 30 MHz) and provides the ability to extend the system into new significantly higher frequency widebands (e.g., frequencies between 30 MHz and 1 GHz) to improve the overall throughput of the resulting communication system while simplifying the implementation of any single given wideband.

The power line communication device comprises a network interface device that employs an analog signal separating device (e.g., analog filter) to separate the paths of different wideband signals received from the power line before converting them to their digital representation. The analog signal separating device also separates the paths of different wideband signals to be transmitted on the power line (after their conversion from their digital representation). The network interface device optionally employs TDMA (time division multiple access) and/or FDMA (frequency division multiple access) as a scheme for enabling co-existence, synchronisation and/or bi-directional transmission.

The analog signal separating device is configured from block elements comprising discrete and/or integrated electronic components and the natural characteristics of the wiring and/or printed circuit board traces used to interconnect said components.

In some embodiments, the power line communication device is employed in a system that is configured to be expandable to provide greater overall bandwidth, but with widely differing injected power levels in the different frequency ranges, and/or to coexist and be inter-operate with other pre-existing technologies on the same network.

In various embodiments, each of the pre-existing and new-generation power line technologies is configured to implement different modulation schemes (e.g. OFDM, CDMA (code division multiple access) and/or OWDM (orthogonal wavelet domain modulation)), either alone or in combination). Depending on its configuration, the power line communication device can send data through any or all of the widebands. Furthermore, depending on its network function, the power line communication device can distribute the data from a single source or mesh it together with data repeated from another node on the network.

In various embodiments, each node on the power line communication network is an apparatus that integrates the analog signal separating device and modem converters (e.g. DFE (Digital Front End), MAC (Media Access Control), etc.) as part of the power line network interface device; and an application such as a computer, mass storage device, display device, speaker, DVD (Digital Versatile Disc) player, PVR (Personal Video Recorder), etc.; and/or an interface to connect an application such as a digital audio interface, digital video interface, analog audio interface, analog video interface, Ethernet interface, IEEE1394/Firewire/iLink interface, a USB (Universal Serial Bus) interface, SDIO interface, PCIExpress interface and/or the like.

In some embodiments, the power line communication device is configured to use a signal (in line with the current standards and injected power regulations) of frequency less than about 30 MHz and at least one other signal of frequency greater than 30 MHz without compromising the performance of any of the signals due to interference. This feature can enable the power line communication device to increase throughput whilst enabling interoperability with previous PLC technologies.

An advantage of using a low frequency band is the possibility for higher coverage (e.g., communication over greater distances) than that achievable with a high frequency band, due to the greater injected power allowed by the regulations and the lower channel attenuation. An advantage of using a high band is the higher throughput achievable due to the greater available bandwidth.

In some embodiments, the power line communication device is configured to exploit the natural topology of power line networks in a home, wherein a group of related devices and sockets are typically clustered close to each other (e.g. plasma screen, DVD player and speakers in a living room) and other clusters of devices and sockets are clustered elsewhere (e.g. desktop printer, scanner and ADSL router in a home office). Such household topologies can benefit from the high throughput short-range coverage provided by the high band (which is simultaneously and independently available within each of the clusters) whilst the low band can be used to carry the majority of data communications between the clusters. It will also be appreciated that some communication nodes may benefit from communications on both bands.

In some embodiments, the parallel use of multiple widebands enables the use of different injected power levels, receiver sensitivities, transmission times, symbol lengths and modulation techniques to optimise the performance and cost of each wideband, leading to a better cost performance solution even though it is necessary to provide more than one analog and digital front-end. Part of the implementation cost advantage arises from the ability to reduce the bps/Hz in each wideband, but still maintain throughput performance because of the additional bandwidth available. This effect non-linearly compensates for the cost of implementing more than one wideband communication technology. Furthermore, the reduced coverage of the high band(s) is offset by the parallel use of the low band (with its greater allowable injected power). For instance, in various embodiments, the power line communication device may be used to provide Gbit/s performance at a lower cost than current 200 Mbps systems, by using lower bps/Hz modulation schemes (i.e. approximately 5 bps/Hz rather than 10 bps/Hz) over multiple widebands.

In various embodiments, a network interface device is configured to employ analog signal separation and include multiple analog front-ends. The use of analog signal separation, based on frequency, enables each wideband technology to optionally operate independently, and may include one or more of the following features:

(a) The network interface device is configured for independent performance optimization of the analog to digital converters (ADCs), digital to analog converters (DACs) and PGA or line drivers employed in processing the signals from a given frequency band, wherein the optimisation is performed for the required bandwidth, linearity and dynamic features of the frequency band and optimised for the power levels required to match EMC regulations and/or coverage of the frequency band;

(b) The network interface device is configured for the power line communication device to maintain compatibility and inter-operability with existing standards using one of the frequency bands, whilst exploiting independently (and without causing prohibitive interference to) another frequency band for additional communication (for example, the Homeplug AV standard which uses frequencies in the range of 2 MHz-28 MHz could work simultaneously with another standard that uses frequencies greater than 30 MHz);

(c) The network interface device is configured to increases the capacity of the power line communication device by allowing the inclusion of additional widebands that do not need to use the same modulation technology, but can use modulation technologies that best match the new frequency bands' power line channel characteristics; and (d) The network interface device is configured to allow different widebands to operate without synchronisation to or dependence on other widebands.

In various embodiments, the power line communication device is also configured to allow other network technologies to be layered independently on top of it, for example:

(a) combinations of data from different bands at various different communication levels whether in the digital front-end, the MAC layer or the application layer;

(b) using notches in the modulation scheme to limit emissions of certain frequencies within one of the analog defined wideband frequencies;

(c) using repeaters in a node to re-transmit on the same or a different frequency band;

(d) using a range of modulation schemes such as OFDM, CDMA and/or OWDM; and/or (e) forming point-to-point, point-to-multipoint and or multipoint-to-multipoint communication patterns.

In some embodiments, the network interface device can combine and partition data communicated across different paths to maximise performance, coexistence and interoperability whilst minimizing system cost.

Various embodiments of the invention include a method comprising receiving digital data form one or more applications, encoding a first part of the digital data into a first signal within a first wideband frequency range, at least part of the first wideband frequency range being less than 30 MHz, encoding a second part of the digital data into a second signal within a second wideband frequency range, at least part of the second wideband frequency range being greater than 30 MHz, combining the first signal and the second signal to generate a combined signal, and sending the combined signal over a power line.

Various embodiments of the invention include a method comprising receiving a signal over a power line, separating the received signal into a first signal component in a first wideband frequency range and a second signal component in a second wideband frequency range, each of the first wideband frequency range and the second wideband frequency range being at least 10 MHz wide, separately processing the first signal component and the second signal component to extract digital data, and providing the digital data to one or more applications.

Various embodiments of the invention include a communication network comprising a first communication node configured to communicate using a first wideband frequency range at least 10 MHz wide and a second wideband frequency range at least 5 MHz wide, a second communication node configured to communicate with the first communication node over a power line by simultaneously using both the first wideband frequency range and the second wideband frequency range.

Various embodiments of the invention include a communication device comprising a coupling configured to communicate data over a power line, a first part of the data being communicated using a first wideband frequency range and a second part of the data being communicated using a second wideband frequency range separate from the first wideband frequency range, the first part of the data being independent from the second part of the data, first logic configured to process the first part of the data, and second logic configured to process the second part of the data.

Various embodiments of the invention include a communication network comprising a first communication node configured to communicate using a first wideband frequency range, a second communication node configured to communicate using a second wideband frequency range separate from the first wideband frequency range, and a third communication node configured to simultaneously and independently receive communication from the first communication node over a power line using the first wideband frequency range and from the second communication node over the power line using the second wideband frequency range.

Various embodiments of the invention include a method comprising communicating first data between a first communication node and a second communication node over a power line, using a first wideband frequency range, and communicating second data between the first communication node and a third communication node over the power line, using a second wideband frequency range separate from the first wideband frequency range, the first data and the second data being communicated simultaneously.

Various embodiments of the invention include a method comprising sending a first communication from a first communication node over a power line using a first wideband frequency range, the first communication including data configured to identify a second communication node configured to communicate in the first wideband frequency range, receiving a response to the first communication from the second communication node, sending a second communication from the first communication node over the power line using a second wideband frequency range, the second communication including data configured to identify a third communication node configured to communicate in the second wideband frequency range, receiving a response to the second communication from the third communication node, and determining a communication strategy based on the response to the first communication and the response to the second communication.

Various embodiments of the invention are directed to a network interface device comprising a first block, a second block, a data distribution block, a coupling/decoupling stage, and first and second analog passband filters. The a first block includes a first PHY layer in communication with a first MAC layer, and the first block is configured to implement a first wideband communication technology associated with a first wideband frequency range. Likewise, the second block includes a second PHY layer in communication with a second MAC layer, and the second block is configured to implement a second wideband communication technology associated with a second wideband frequency range. The data distribution block is in communication with the first and second MAC layers and is configured to receive and distribute the data to the first and second blocks. The coupling/decoupling stage is configured to couple signals within the first and second wideband frequency ranges onto an AC power line. The first analog passband filter is disposed between the first PHY layer and the coupling/decoupling stage and is configured to attenuate signals with frequencies outside of the first wideband frequency range. Similarly, the second analog passband filter is disposed between the second PHY layer and the coupling/decoupling stage and is configured to attenuate signals with frequencies outside of the second wideband frequency range. In various embodiments the data distribution block is configured to distribute the data to the first and second blocks based on network traffic characteristics, or based on the respective channel capacities of the first and second wideband frequency ranges, or based on feedback from the first and second PHY layers, or based on a requirement such as a latency requirement or a quality of service requirement. The data distribution block may also be configured to distribute the data to the first and second blocks based on any combination of these factors.

In various embodiments of the network interface device, the first wideband frequency range comprises a first high band, and in some of these embodiments the second wideband frequency range comprises a second high band. In various embodiments the first wideband frequency range is from 2 MHz to 30 MHz and the second wideband frequency range is from 50 MHz to 300 MHz.

In various embodiments of the network interface device, the data distribution block is further configured to receive the data from a single application and simultaneously distribute the data to the first and second blocks. The data distribution block can also be further configured to receive the data from two applications, and to distribute data from the first application to the first block, and to simultaneously distribute data from the second application to the second block, in various embodiments. Also, in various embodiments, the distribution block is further configured to receive the data from a single application and distribute the data to the first block and simultaneously receive other data from the second MAC layer and pass the other data to a second application. The data distribution block can be further configured to receive other data from the first MAC layer and the second MAC layer simultaneously, and pass the other data to a single application, in various embodiments.

Various embodiments of the network interface device further comprise a third block including a third PHY layer in communication with a third MAC layer, where the third block is configured to implement a third wideband communication technology associated with a third wideband frequency range. The third block is disposed between the data distribution block and the coupling/decoupling stage. These embodiments further comprise a third analog passband filter disposed between the third PHY layer and the coupling/decoupling stage and that is configured to attenuate signals with frequencies outside of the third wideband frequency range. In some of these embodiments the data distribution block is further configured to receive the data from a first application and a second application and distribute data from the first application to the first block and simultaneously distribute data from the second application to the second block, and also simultaneously receive other data from the third MAC layer and pass the other data to a third application. In some other of these embodiments, the data distribution block is further configured to receive the data from a first application and simultaneously distribute the data to the first and second blocks, and simultaneously receive other data from the third MAC layer and pass the other data to a second application. The data distribution block, in various embodiments, is also further configured to receive the data from an application and simultaneously distribute the data to the first, second, and third blocks.

BRIEF DESCRIPTION OF THE DRAWINGS

Multiple embodiments of the invention will now be described by way of example only with reference to the accompanying Figures in which:

FIG. 5B is a block diagram of an alternatively partitioned second integrated circuit embodiment of the power line communication device;

FIG. 5C is a block diagram of a further alternatively partitioned third integrated circuit embodiment of the power line communication device;

FIG. 7C shows the signal isolation provided by a second analog filter $Filt_B$ (shown in FIG. 7B) to the $Tech_B$ signal (shown in FIG. 7A), according to various embodiments;

DETAILED DESCRIPTION

Figure 1:
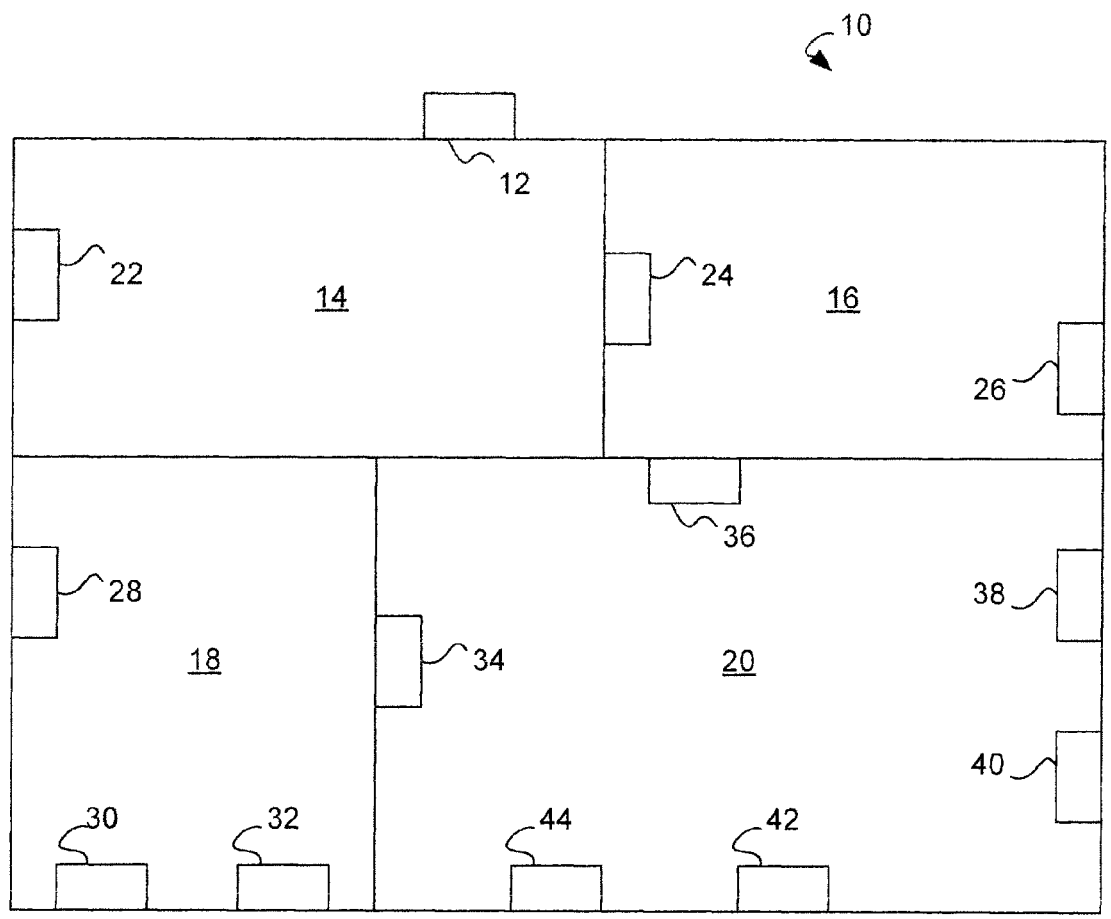
FIG. 1 is a block diagram of a prior art residence.

For the sake of clarity, the term "power line" will be used herein to refer to low voltage household mains distribution cabling (typically 100-240 V AC power) or any other distributed electrically conductive cabling (i.e. AC or DC), that is capable of passing power to appliances connected to it. Furthermore, the term "power line technology" will be used herein to refer to a specification that when implemented as a series of network interface devices connected to a power line, enables the devices to bi-directionally communicate with each other using signals superimposed on the power distribution signal already present on the power line. Additionally, the term "channel" will be used herein to refer to the physical medium that connects a transmitter and a receiver.

The term "network interface device" will be used herein to describe an apparatus that implements either fully or partially, a communications technology, such as a power line technology, to enable the apparatus to communicate with other devices connected to the same network (such as a power line), regardless of whether or not the apparatus is integrated with other apparatuses or functions within a single enclosure. For the sake of clarity, a device connected to a power line network will be generically known herein as a "node".

The term "coverage" will herein be used to refer to the maximum distance between two nodes at which data transmitted therebetween is still detectable by either node. In addition, the term "throughput" will be understood to represent the rate at which nodes send or receive data on a network.

For completeness and since the present invention relates to wideband communication, the term "wideband" will be used herein to refer to a frequency band or range used by a power line technology signal, characterised by having a bandwidth of greater than, or equal to, 5 MHz from the first (lowest) frequency to the last (highest) frequency of the band irrespective of the presence of notches. However, in various embodiments, widebands may have bandwidths of at least 7, 10, 12, 15, 20, 50, 100, 200 or 250 MHz. Similarly, the term "narrowband" will be used to refer to a frequency band used by a power line technology signal, characterised by having a bandwidth of less than 5 MHz. A "band" is further defined herein as the range of frequencies that the OFDM signal occupies in the spectrum, from the lowest frequency carrying data to the highest frequency carrying data. Each band, whether narrowband or wideband, comprises a plurality of carriers. In an OFDM modulation, each frequency point that corresponds to each of the FFT points used to build the OFDM symbol is a "carrier." The terms "carrier" and "sub-carrier" are used synonymously herein. In various embodiments, the number of carriers in a wideband can equal, or exceed, 25, 50, 100 or 200.

For the sake of clarity, in terms of explanation of operation of the power line communication device around current power line technologies, a wideband frequency band used in the power line communication device whose frequency of less than about 30 MHz, will be known herein as a "low band". Similarly, a wideband frequency band used in the power line communication device whose frequency is greater than about 30 MHz will be known herein as a "high band".

The term "transmission time" is herein used to describe the maximum amount of time it takes to transmit a single co-existent message. The transmission time includes, but is not limited to, a start of transmission marker time (if any), a synchronisation time (if any), a channel access resolution time (if any), a negotiation time (if any), a message transmission time, an acknowledge transmission time (if any) and an end of transmission marker time (if any).

The term "notch" will be used herein to refer to a frequency band where the energy level of a power line technology signal has been deliberately reduced to prevent interference with other users of the spectrum (whether on or off the power line). Notches are characterized by having a narrower bandwidth than the power line technology signal itself and are generally implemented by digital or analog signal separating device within a single digital signal processing block or analog front end.

For the sake of clarity, the term "sub-band" will be used herein to refer to a frequency band where a power line technology signal characteristic differs from the characteristics of the power line technology signal in the remainder of the signal's bandwidth. Such differences can include the optional or mandatory presence of the sub-band, the signal power level of the sub-band and the directionality of the sub-band. Sub-bands are characterized by having a narrower bandwidth than the power line technology signal itself. The use of overlapping sub-bands in OFDM enables notches to be created, wherein a sub-band is disabled if the reception of the sub-band is heavily impaired or the sub-band can interfere with another service. Furthermore, OWDM can simplify the notching out of carriers due to its lower side lobes.

For the sake of simplicity, the term "transmitter signal path" will be used to refer to the path of a signal transmitted from an apparatus to the power line. Similarly, the term "receiver signal path" will be used to refer to the path of a signal received by an apparatus from a power line. On a related note, it may not be necessary to perform the isolation on both the receiver and transmitter signal paths (depending on the specifications of the analog components and the modulation techniques employed therein).

For the sake of clarity, the power line communication device of the present invention will be referred to herein at times as an "improved power line communication device". Similarly, the network interface device of the improved power line communication device will be referred to herein as an "improved network interface device". Finally, the power line communication network comprising nodes that are improved communication devices will be known herein at times as an "improved power line communication network".

The term "separate," as used herein with respect to widebands, is to characterize widebands that do not use, except incidentally, the same frequencies for communication data or commands. Widebands may be separate but interleaved, e.g., overlapping.

The term "simultaneously" is used herein with respect to communicating data to indicate that at least part of first data or commands are communicated using a first wideband at the same time as at least part of second data or commands are communicated using a second wideband. Simultaneous transmission is contrasted with systems that alternate or interleave the use of frequencies, one after the other or hopping from one to the other.

The term "independent" is used herein with respect to data transmitted to indicate that data transmitted using one wideband does not depend on data simultaneously transmitted using another wide band. Independent data transmission can include, for example, data sent to or received from different locations. Data in which alternative bits are transmitted using different frequencies is not independent because the bits are dependent on each other to form a useful byte.

It will be appreciated that the specific network and other examples described in these sections are used for illustrative purposes only. In particular, the examples described in these sections should in no way be construed as limiting the improved power line communication device.

Some embodiments of the improved power line communication network comprise a plurality of nodes of which some employ a network interface device that enables simultaneous and independent communication over two or more widebands, to similar multi-wideband nodes or conventional nodes. A first wideband optionally comprises frequencies of less than 30 MHz, in line with the current standards and injected power levels (and will herein be known as a low band) and the other wideband(s) comprise frequencies of greater than 30 MHz (and will herein be known as high band(s)). Alternatively, both the first and second widebands may comprise frequencies greater than 30 MHz. This enables power line technologies to be optimised for each of the widebands, so that the trade-off between cost, coverage and throughput will be superior to that achieved by a purely mono-wideband approach.

In particular, the modulation schemes for each technology used within the improved power line communication network can be optimised for cost. For instance it may not be necessary to use a particularly high modulation density (bps/Hz) in the low band to enhance throughput because the low band can work in parallel with the inherently high throughput high band(s).

The improved power line communication network provides inter-operability with prior art power line technologies by also supporting communication between multi-wideband nodes and mono-wideband nodes (that use one of the power line technologies supported in the low band or high band(s) and communicate at frequencies in the low or high band(s).

The improved network interface device may be part of an external modem apparatus or embedded within another apparatus (e.g. computer, TV etc.). However, regardless of the manner in which an improved network interface device is included within a node, the device remains physically connected to electrically conductive cabling (that passes AC or DC power) and is capable of transmitting digital data across the cabling using either or all of the low and high bands.

In accordance with current regulatory standards, low band signals may be transmitted with a power of approximately up to −50 dBm/Hz quasi-peak whereas high band signals may only be transmitted with a power that causes emissions in this frequency band to be lower than −80 dBm/Hz quasi-peak. Accordingly, signals in the low band may be transmitted with a power approximately one thousand times greater than signals in the high band. Consequently, if signals in both of these bands were to be transmitted simultaneously, without using some form of analog frequency isolation, the dynamic range and voltage compliancy requirements of the high band signals would be significantly increased.

However, the potential for interference or saturation of a lower power signal may be even more problematic. In particular, if one of the bands is used to receive a line-attenuated signal whose power level is close to the noise on the power line (i.e. −150 dBm/Hz), while at the same time, the other band is used to transmit a signal at its maximum allowable transmission power, the isolation required to prevent the signals from the two bands from interfering with each other would be approximately 100 dB. However, this is beyond the current state of the art analog implementations and would have high implementation costs.

In summary the isolation required to effectively allow simultaneous and independent communication of high and low bands falls into three main categories:
  (1) isolation to prevent the strength of a signal received over the network in one wideband from saturating the receiver of the other wideband;
  (2) isolation to prevent the transmitter of one band from interfering with the reception of another band; and
  (3) isolation to prevent the degradation of the transmitter for one band when another band is being transmitted.

In view of the above, the improved network interface device employs an analog signal separation device to isolate the paths from the power line connection to the analog to digital converter for each wideband. One of the most efficient ways of providing this isolation is by high-pass filtering or band-pass filtering high band signals, whilst minimising out-of band signals in the low band (using high linearity components and possibly analog low-pass smoothing or anti-aliasing).

Signals in the high band and the low band can use the same or different modulation techniques (e.g. OFDM, CDMA and/or OWDM) or time division schemes to facilitate co-existence and/or bi-directional communication. In one possible scenario, the low band could employ a modulation scheme that is inter-operable with one of the existing power line modem standards or proposals, whilst the high band is used for performance expansion beyond previous standards. Data and/or control can be passed through one or both of the widebands simultaneously and via a plurality of nodes in the form of a repeater (e.g., relay) network.

There are many different ways of implementing the improved power line communication device. For example, the improved power line communication device may be implemented on one or more integrated circuits (whether dedicated to the modem function or as part of an application system on a chip), and in combination with the characteristics of passive components and interconnects. However, the implementation of the analog signal separating device to separate the low band and high band(s)) employs a combination of the components in the different signal paths, whether passive or active, integrated or discrete. In particular, it is possible for the widebands:
  (a) to share part of their paths (e.g. through a coupling unit); or
  (b) to be joined only at the power line; and/or
  (c) to be at opposite ends of the apparatus.

It is also possible to expand the improved power line communication device to communicate on more than two widebands. Similarly, it is also possible for the widebands to overlap slightly if required, and to be different in frequency ranges or bandwidths to those cited in the specific description.

Figure 2A:
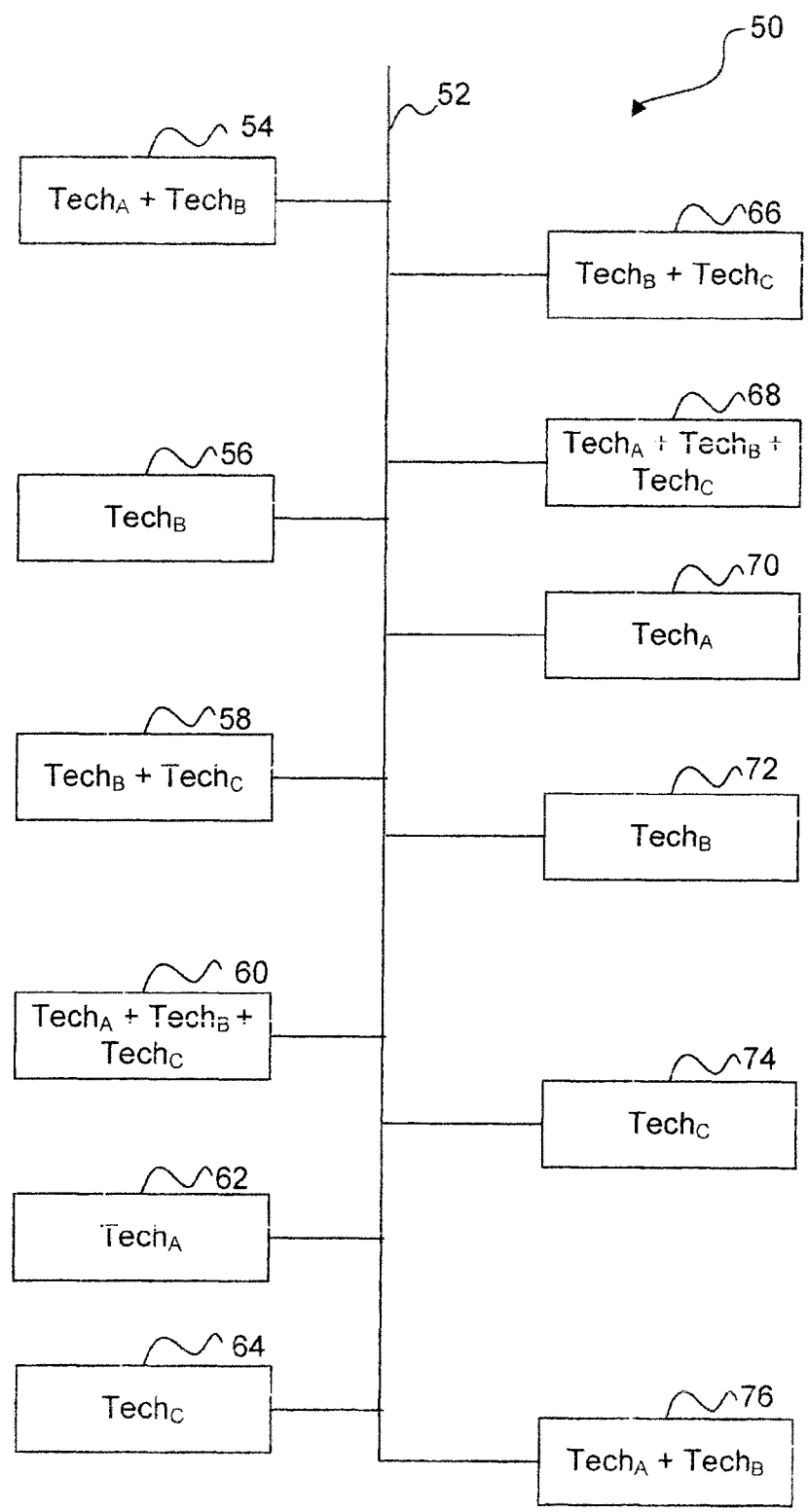
FIG. 2A is a block diagram of an exemplary network comprising a plurality of nodes, some of which have multiple wide-band capabilities, according to various embodiments.

Referring to FIG. 2A, a network 50 that represents the improved power line communication network comprises a plurality of nodes 54-76. Some of the nodes comprise the improved power line communication device and accordingly implement more than one PLC technology. Nodes that do not include the improved network interface device can only implement one PLC technology. For the sake of simplicity, nodes that can only implement one PLC technology will be known herein as "mono-wideband nodes". Similarly, nodes that can implement more than one technology will be known herein as "multi-wideband nodes".

Three different PLC technologies are employed for communication on the network, namely $Tech_A$, $Tech_B$ and $Tech_C$. Nodes 54 and 76 comprise the improved network interface device and are capable of implementing PLC technologies $Tech_A$ and $Tech_B$. Nodes 58 and 66 comprise the improved network interface device and are capable of implementing PLC technologies $Tech_B$ and $Tech_C$. Finally, nodes 60 and 68 comprise the improved network interface device and are optionally capable of implementing all three PLC technologies.

The remaining nodes (namely nodes 56, 62, 64, 72 and 74) do not comprise the improved network interface device and thus can only implement one of the PLC technologies. In particular, nodes 62 and 70 implement PLC technology $Tech_A$ only, nodes 56 and 72 implement PLC technology $Tech_B$ only, and nodes 64 and 74 implement PLC technology $Tech_C$ only. Optionally, all of the communication between the nodes on the network 50 takes place through a common power line 52.

In some embodiments, the improved power line communication network supports communication between nodes that implement different PLC technologies. In contrast, prior art PLC systems can only support communication between nodes that implement identical PLC technologies (e.g. nodes 56 and 72), even if the nodes in question co-exist on a network with nodes that implement other PLC technologies (e.g. nodes 64 and 74).

Figure 2B:
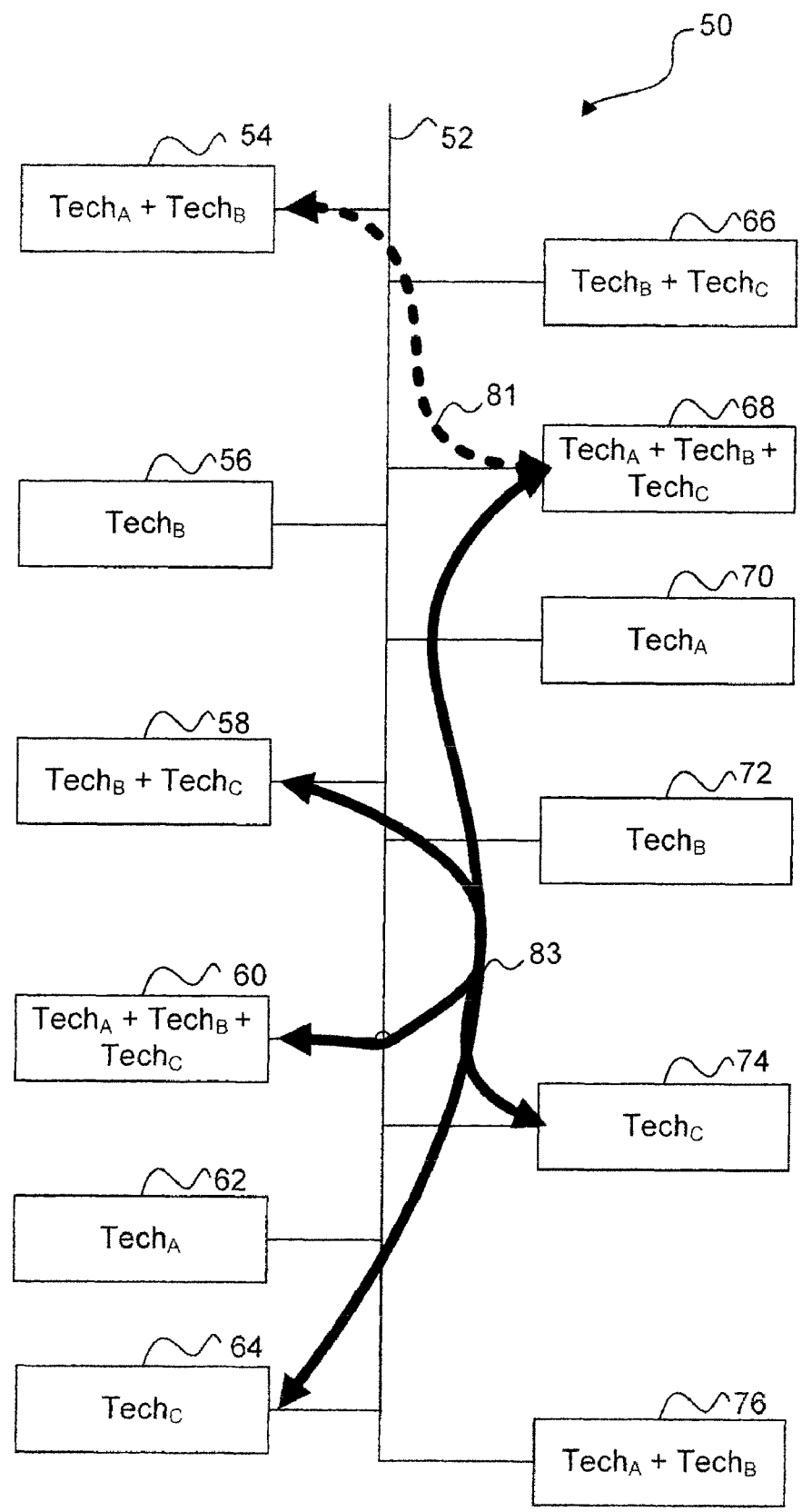
FIG. 2B is a block diagram of the exemplary network of FIG. 2A, depicting two simultaneous, bi-directional communication links therein, according to various embodiments.

FIG. 2B shows two simultaneous, bi-directional and non-interfering communication links in the network 50 of FIG. 2A. A first communication link 81 is a point-to-point communication link between nodes 54 and 68 which simultaneously uses the high band and low band to enable simultaneous communication of both $Tech_A$ and $Tech_B$ messages between the two nodes.

It should be noted that whilst node 68 is optionally capable of implementing all three technologies (i.e. $Tech_A$, $Tech_B$ and $Tech_C$) only the $Tech_A$ and $Tech_B$ capabilities of node 68 are used in the first communication link 81. Furthermore, it should be noted that the first communication link 81 can re-distribute data from the $Tech_A$ and $Tech_B$ technologies across the high band and the low band in accordance with the current network characteristics (e.g. channel impairments).

A second communication link 83 connects nodes 68, 58, 60, 74 and 64. Since nodes 64 and 74 are only capable of implementing PLC technology $Tech_C$, the second communication link 83 only supports communications of the $Tech_C$ technology.

The presence of the two communication links 81 and 83 allows nodes 68, 58, 60, 74 and 64 to establish communication (through the second communication link 83) at the same time that node 68 is communicating with 56 (through the first communication link 81). In other words, the network arrangement depicted in FIG. 2B, enables two simultaneous and concurrent communications to be performed, wherein the first communication link 81 enables dynamic data transmission and reception using technologies $Tech_A$ and/or $Tech_B$ and the second communication link 83 enables dynamic data transmission and reception using technology $Tech_C$.

Figure 2C:
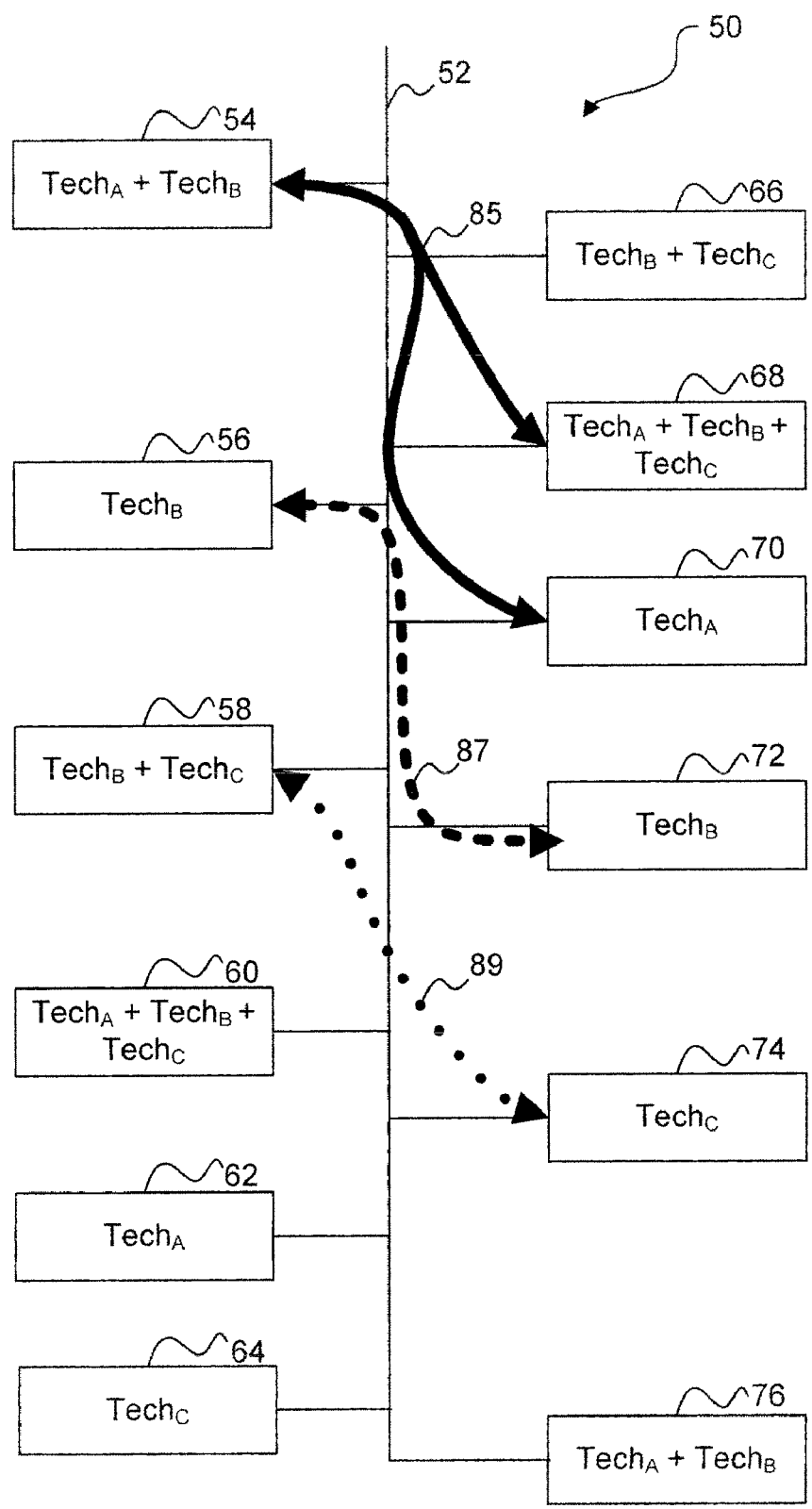
FIG. 2C is a block diagram of the exemplary network of FIG. 2A, depicting three simultaneous communication links therein, according to various embodiments.

FIG. 2C shows three concurrent and simultaneous communication links 85, 87 and 89 in the network 50 of FIG. 2A. The first communication link 85 provides a bi-directional point-to-multipoint connection between node 54 and nodes 68 and 70. Since node 70 is only capable of implementing technology $Tech_A$, the first communication link only supports communications of the $Tech_A$ technology. Meanwhile a second communication link 87 enables communication between nodes 56 and 72 of technology $Tech_B$ with technology $Tech_A$, using a co-existence strategy such as Time Division Multiple Access (TDMA).

Finally, a third communication link 89 supports communication of $Tech_C$, wherein these communications are conducted in a different wideband that does not interfere with the other communication links.

Figure 2D:
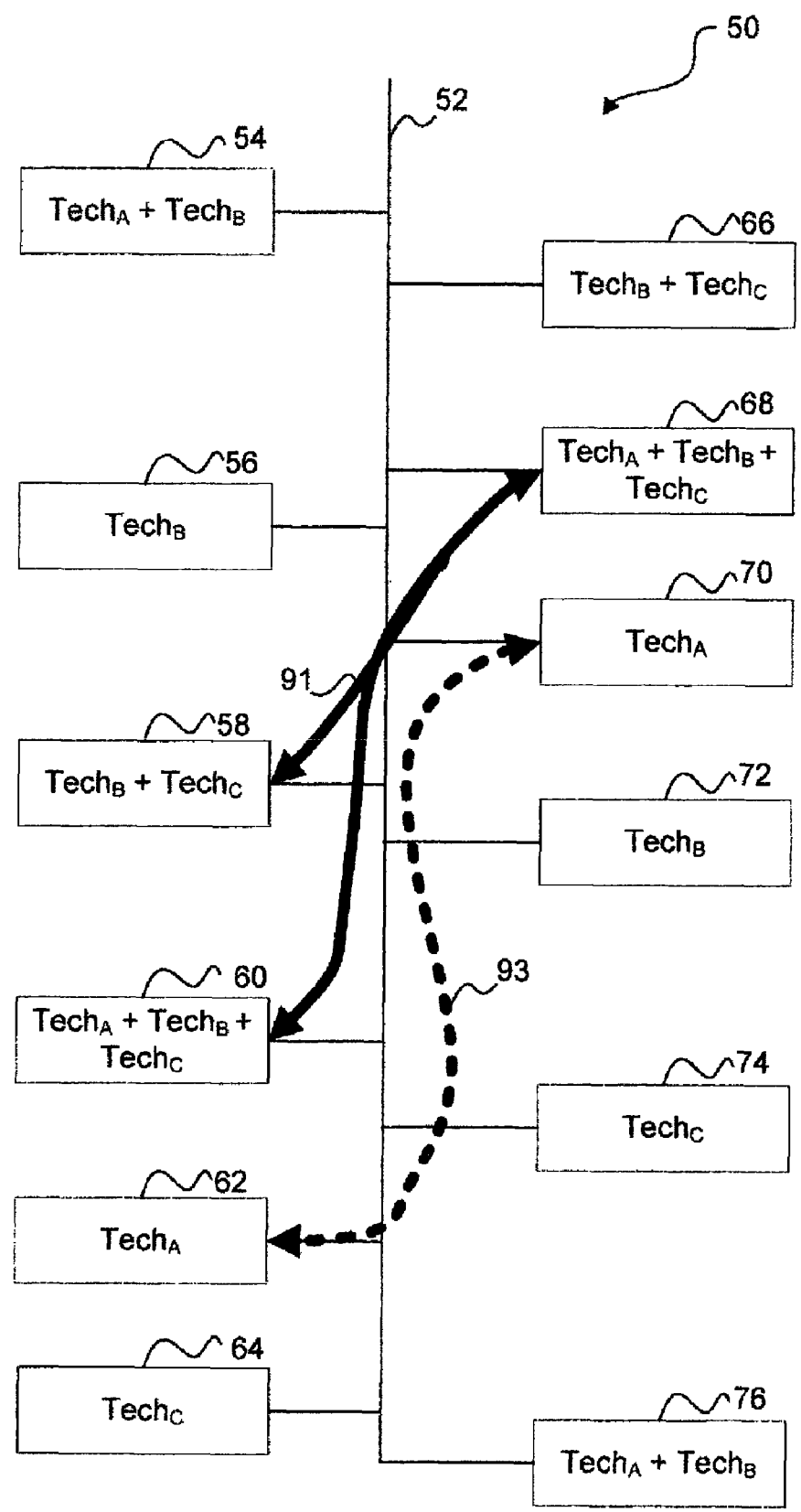
FIG. 2D is a block diagram of a first stage of a one packet data transmission procedure implemented on the network of FIG. 2A, according to various embodiments.

Referring to FIG. 2D, let there be a first communication link 91 between nodes 68, 58 and 60 of the network 50 depicted in FIG. 2A. The first communication link 50 is bi-directional and supports communication of $Tech_B$ and $Tech_C$. Furthermore, let there be a simultaneous second communication link 93 between nodes 70 and 62 of the same network 50. The second communication link 93 supports communication of $Tech_A$.

For the sake of example, let there be a message originating in node 58 that to be distributed to the nodes of the network 50. Nodes such as 68, 60 and 66 that support $Tech_B$ and $Tech_C$, can demodulate and receive a message from node 58. However, the remaining nodes on the network 50 cannot receive the message. To solve this problem, a two-stage communication process is implemented in which:

(i) in the first stage, the message is transmitted from node 58 to 68, using PLC technologies $Tech_B$ and $Tech_C$; and (ii) in the second stage, the message is re-transmitted (e.g., relayed) by node 68, using its technology capabilities, so that optionally all of the nodes on the network 50 can receive and demodulate the message.

Repeaters can also be used to increase the coverage of a given technology (when a node can detect its neighbouring node, but not further nodes thereafter).

Figure 2E:
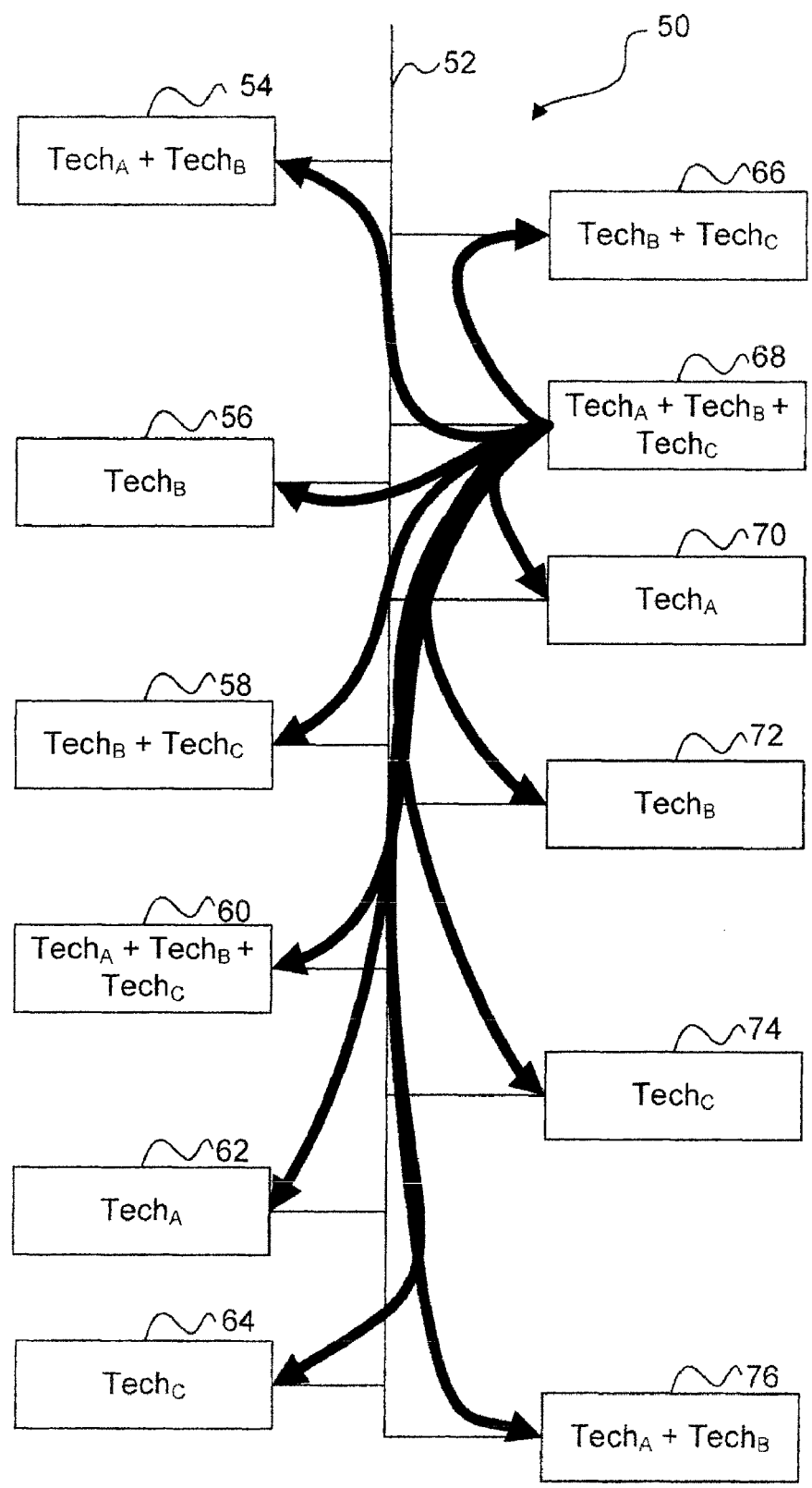
FIG. 2E is a block diagram of a second stage of the one packet data transmission procedure shown in FIG. 2D, according to various embodiments.

FIG. 2E is a block diagram of a second stage of the one packet data transmission procedure shown in FIG. 2D. This second stage optionally includes a broadcast made simultaneously in more than one wideband. As such, the broadcast may include more that one communication standard.

Figure 3:
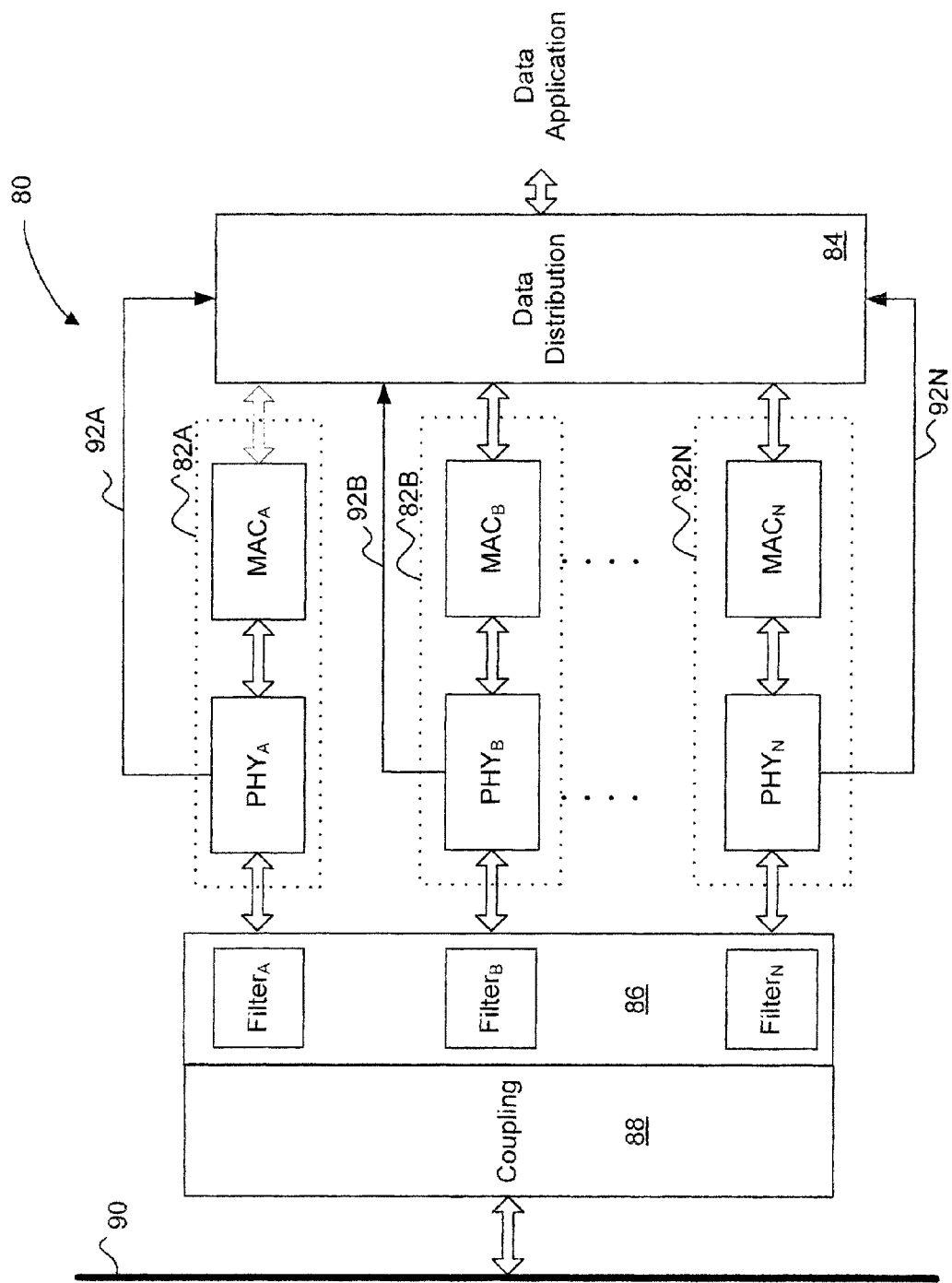
FIG. 3 is a block diagram of the hardware architecture of a modem in a power line communication device, according to various embodiments.

Referring to FIG. 3, a modem 80 in an improved network interface device comprises N blocks 82A-82N, each corresponding to one of the PLC technologies supported by the node. In other words, block 82A corresponds with the $Tech_A$ technology, block 82B corresponds with the $Tech_B$ technology, and so on, until block 82N, which corresponds with the $Tech_N$ technology. The blocks 82A-82N are disposed between a data distribution block 84 and an analog filter block 86. The analog filter block 86 is coupled to a power line 90 by a coupling/decoupling stage 88. The analog filter block 86 includes N analog passband filters, each such passband filter configured to pass signals within a separate band, which can be a wideband, and attenuate those signals at frequencies outside of the particular frequency range of the band. Each passband filter is associated with the particular block 82A-82N that is configured to transmit and receive signals within the frequency range of the passband filter.

Each block 82A-82N comprises the first (PHY) and second (MAC) layers of the OSI (Open Systems Interconnection) stack for each technology. For example, the block 82A comprises the blocks $PHY_A$ and $MAC_A$. Similarly, the block 82B comprises the blocks $PHY_B$ and $MAC_B$. The data distribution block 84 distributes data amongst the blocks 82A and 82N in accordance with, for example, the channel capacity for each band and the current network traffic characteristics. With respect to the capacity of the channel on each band, the data distribution block 84 distributes data between the blocks 82A-82N based on the physical throughput for each band (which is directly related to the channel capacity) and also on the traffic load already present in each of the bands, in order to find the optimum throughput in the network. Other metrics may be used instead of, or in addition to, the previously noted metrics like a quality of service required for each connection and a latency requirement. The current network traffic characteristics may be received by the data distribution block 84 in a number of different ways. For example, every node in the network could send messages to the others nodes that indicate the amount of throughput each is using in each band. Alternatively, a centralized node can maintain such information and provide it to the other nodes. In this way, the traffic load of each band is updated dynamically within the network.

When used for transmission, data from one or more applications is received by the data distribution block 84 for distribution amongst the blocks 82A-82N. The outputs from the blocks 82A-82N pass through the analog filter block 86 and are then combined in the coupling/decoupling stage 88 from which they are injected into the power line 90.

When the modem 80 is used for receiving, the coupling/decoupling stage 88 decouples signals from multiple bands being transmitted on the power line 90, each passband filter in the analog filter block 86 passes one band and rejects the others, the signal in each band is processed through the appropriate block of the blocks 82A-82N, and then the resulting data is forwarded through the data distribution block 84 to the appropriate applications running on the node. It will be understood that transmission and reception are not mutually exclusive acts for the modem 80. Rather, the modem 80 is capable of receiving from one or more bands while simultaneously transmitting on one or more other bands. Bands can also be dynamically reallocated between transmission and reception as needed.

Each of the PHY blocks (PHY$_A$-PHY$_N$) may have a feedback signal 92A-92N which provides information regarding the traffic on, and the quality of, the corresponding band for that PHY block. This information is used by the data distribution block 84 to redistribute the data flow amongst the N available blocks 82A-82N. It should also be noted that parts of the MAC and PHY blocks (PHY$_A$-PHY$_N$) and (MAC$_A$-MAC$_N$) may be capable of sharing resources.

Figure 4A:
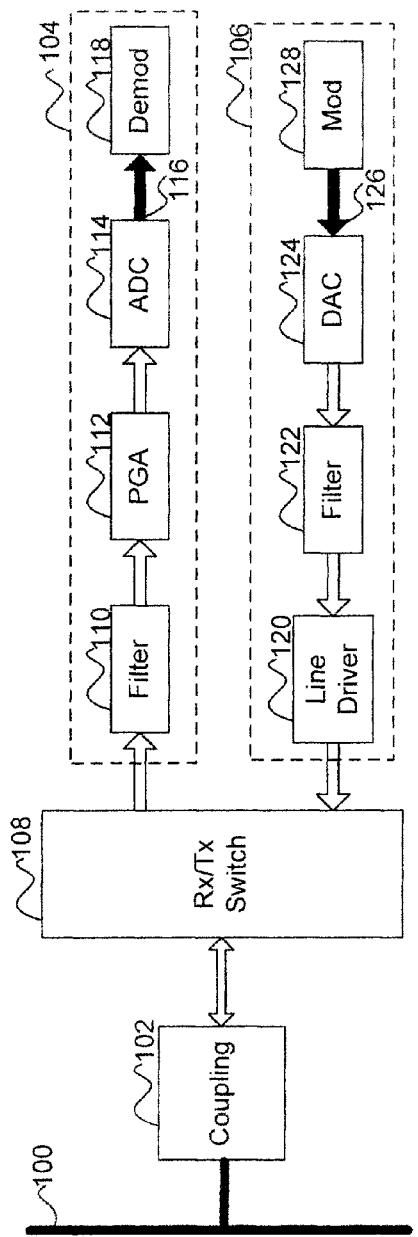
FIG. 4A is a block diagram of signal paths in a single coupling unit prior art power line transmission system, according to various embodiments.

Referring to FIG. 4A, in a first form of a prior art power line transmission system, a power line 100 is connected to a single coupling unit 102, which has high-pass transmission characteristics to enable the rejection of the AC line frequency of the power line 100. The coupling unit 102 is, in turn, connected to receiver and transmitter paths 104, 106, which are isolated during half duplex phases using an RX/TX switch 108.

The receiver path 104 typically comprises a band-limiting anti-aliasing filter 110, a programmable gain amplifier (PGA) 112, and an ADC 114. The resulting digital signal 116 goes then to the demodulator 118. The anti-aliasing filter 110 may be in a different order and may be partially or completely provided by the bandwidth of the PGA 112.

The transmitter path 106 typically comprises a line driver 120 (which may or may not be capable of operating in high impedance mode) and a band-limiting smoothing filter 122. The band-limiting smoothing filter 122 limits the power of harmonics (in the out-of-band range) in the analog signal (the harmonics being produced by the operation of a DAC 124 on a modulated digital signal 126 received from modulator 128). It will be realised that at least some of the functions performed by the modulator 128 and demodulator 118 could also be performed in the analog domain.

Figure 4B:
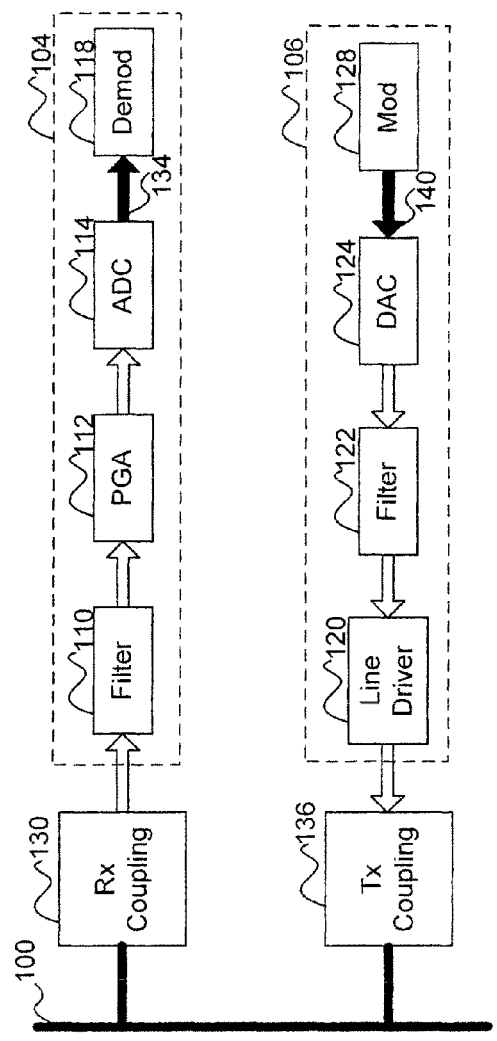
FIG. 4B is a block diagram of signal paths in a dual coupling unit prior art power line transmission system, according to various embodiments.

Referring to FIG. 4B a slightly different form of a prior art single wideband system employs separate transmitter and receiver coupling units 130, 136. A TX/RX switch 108 (FIG. 4A) is not required in this form of the prior art power line transmission system, as either the impedance of the line driver 120 does not significantly represent an extra impedance load to the power line 100, or the line driver 120 itself is capable of going into a high impedance mode.

Figure 4C:
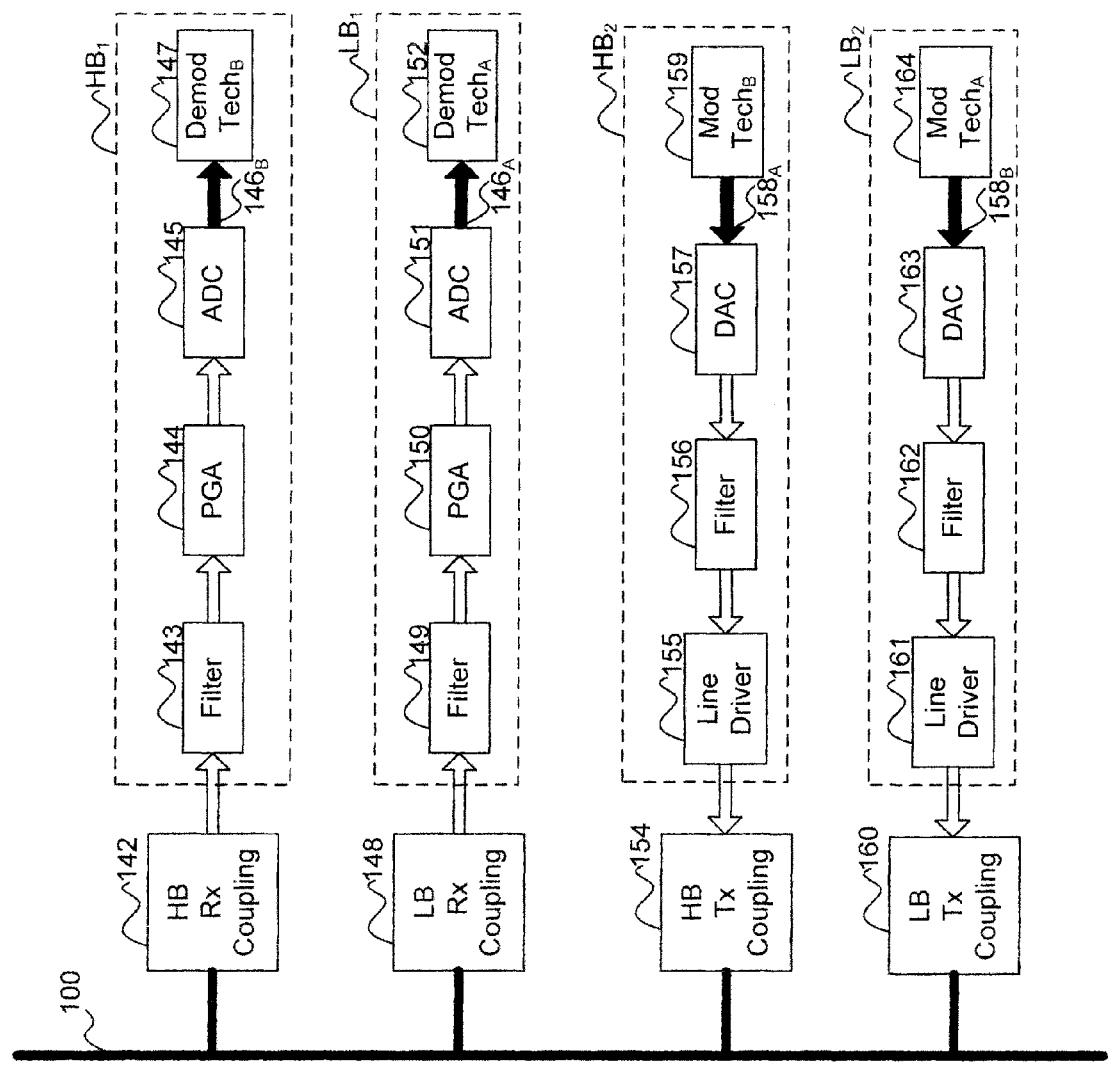
FIG. 4C is a block diagram of signal paths in a first embodiment of the power line communication device.

Referring to FIG. 4C, the improved network interface device comprises two or more analog front-ends separated into two low band analog paths LB$_1$ and LB$_2$ and two high band paths HB$_1$ and HB$_2$, by coupling units 142, 148, 154 and 160 respectively. Each analog front-end comprises a transmission path and a reception path.

The analog filtering characteristics of the different paths (including the coupling units 142, 148, 154, 160 and the active components (filters 143, 149, 156, 162, line drivers 155 and 161, and PGAs 144 and 150) are designed to pass the signal of a given band whilst rejecting the signals of the other bands. The modulation schemes employed by each of the modulators 159, 164 may be the same or different, as may be the demodulation schemes 147, 152.

Figure 4D:
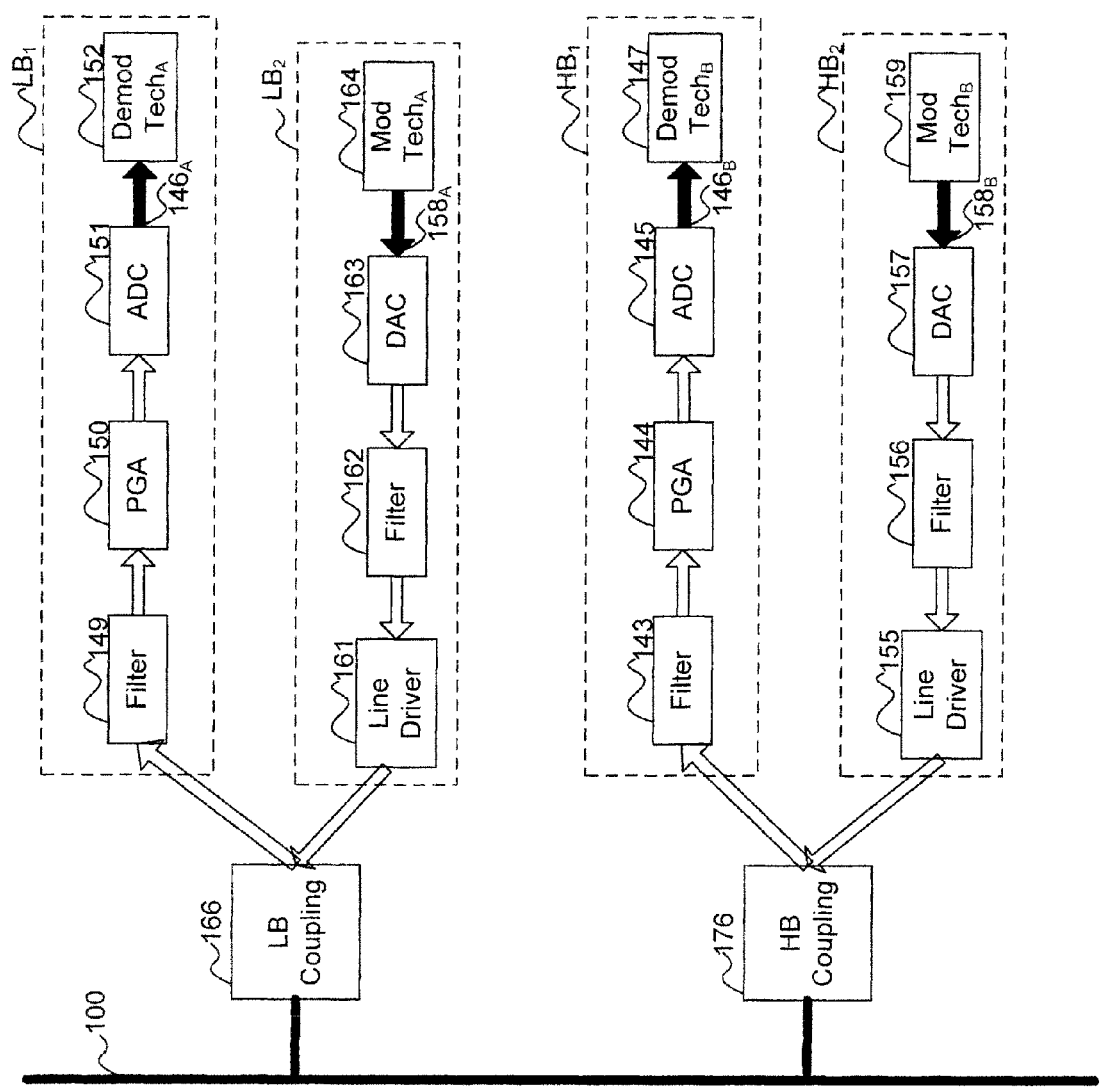
FIG. 4D is a block diagram of signal paths in a second embodiment of the power line communication device.

Referring to FIG. 4D, in a second embodiment of the improved network interface device there are two coupling units 166, 176, wherein coupling unit 166 is used for low band communication and coupling unit 176 is used for high band communication. In addition to the optimisation of the low band paths (LB$_1$ and LB$_2$) and the high band paths (HB$_1$ and HB$_2$) for the power, frequency and modulation schemes of different PLC technologies, the coupling units 166, 176 can be optimised to have different pass-frequency characteristics.

Figure 4E:
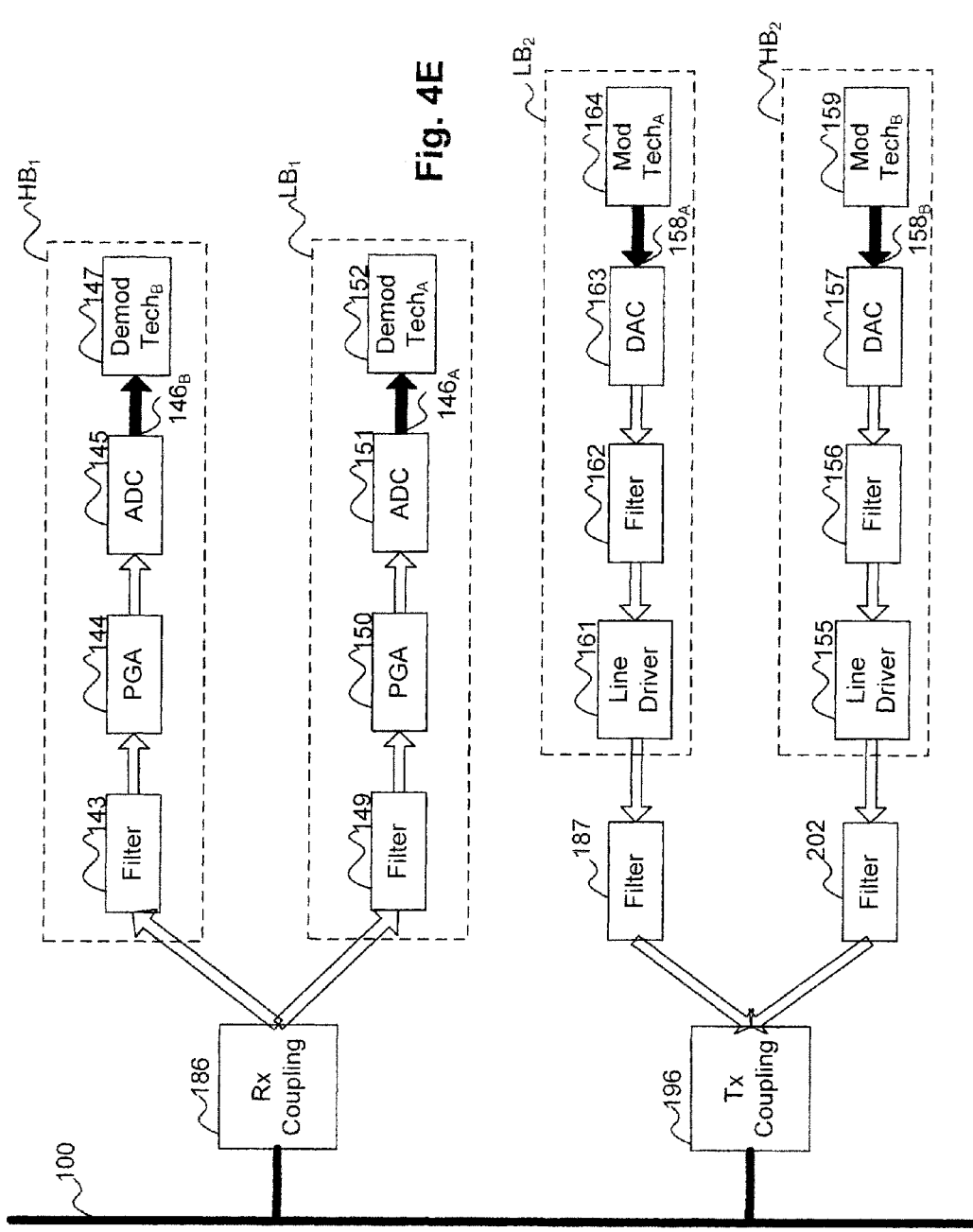
FIG. 4E is a block diagram of signal paths in a third embodiment of the power line communication device.

Referring to FIG. 4E, in a third embodiment of the improved network interface device, there are two coupling units 186 and 196, wherein coupling unit 186 is used for reception and coupling unit 196 is used for transmission. However, each transmission path (LB$_2$ and HB$_2$) is isolated from the other transmission path by deliberately inserted filters 187, 202 with respectively low pass or band pass and high pass or band pass characteristics.

Figure 4F:
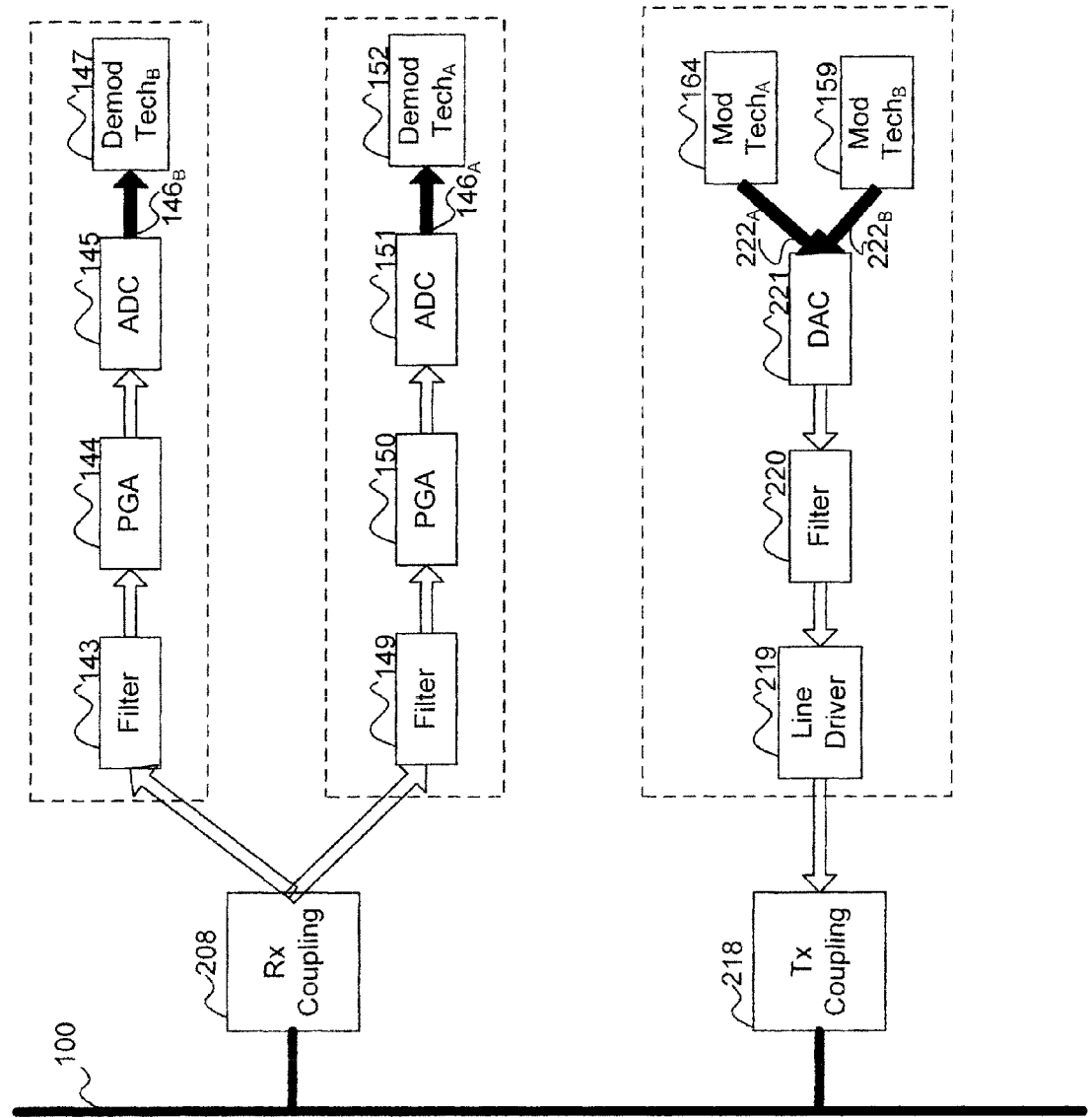
FIG. 4F is a block diagram of signal paths in a fourth embodiment of the power line communication device.

FIG. 4F shows a fourth embodiment of the improved network interface device, applied to two different wideband technologies as in FIG. 4E. Whilst there are many possible other combinations, it is not necessary for there to be separate paths and converters for the high band paths and low band paths in either the receiver or transmitter, as communications in one direction may benefit more from the improved network interface device than communications in the other direction.

The improved network interface device comprises one coupling unit for transmission 218 and one for reception 208. The high band is isolated from the low-band on the receiver path by deliberately inserted filter 143 with high-pass or band-pass characteristics, and similarly the low band is isolated from the high band on the receiver path by deliberately inserted filter 149, with low-pass or band-pass characteristics. However, the transmitter modulation schemes are combined in the digital domain 222A, 222B and then passed through a very high performance DAC (digital to analog converter) 221, smoothing filter 220 and line driver 219.

Figure 5A:
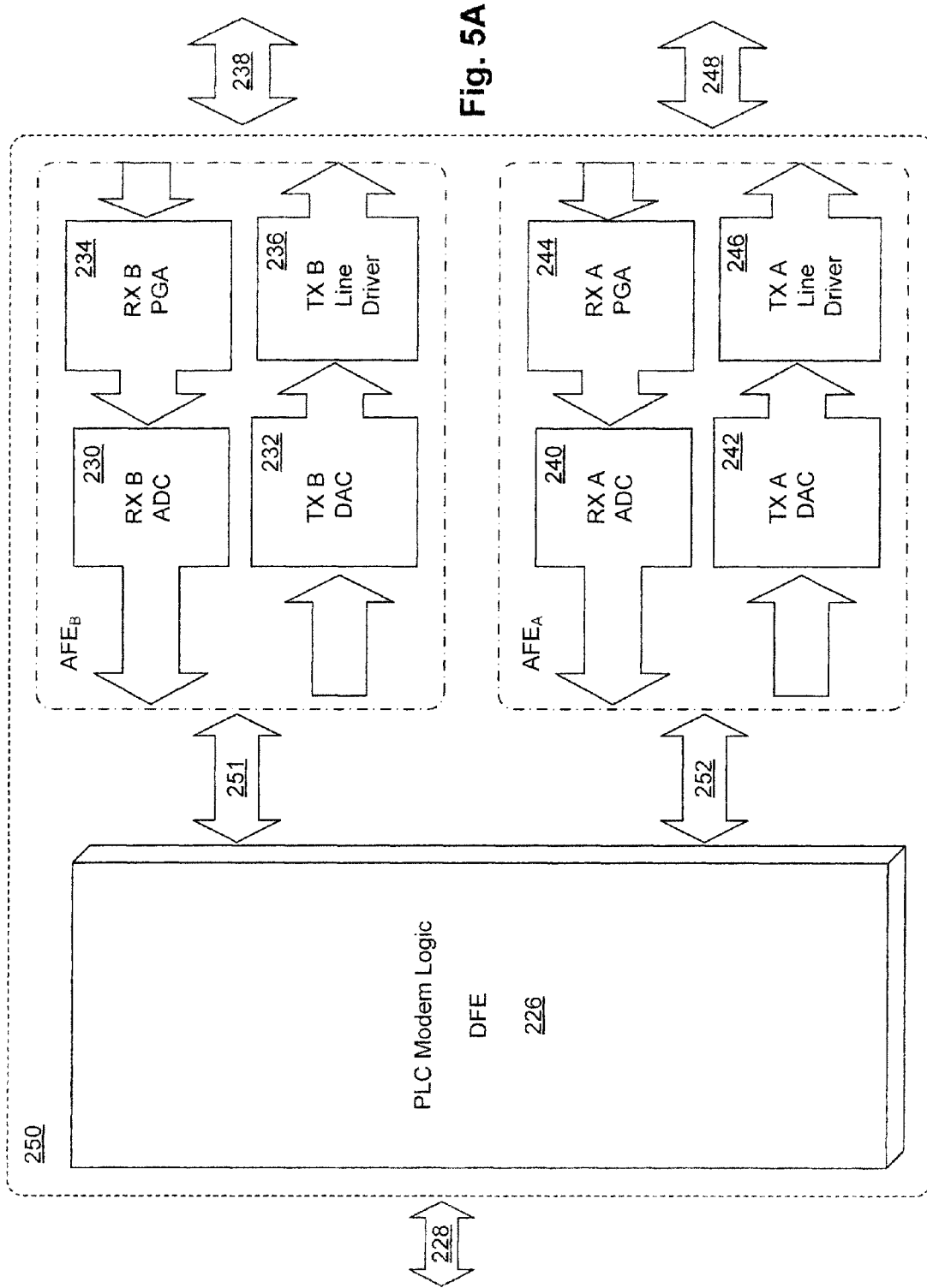
FIG. 5A is a block diagram of a first integrated circuit embodiment of the power line communication device.

Referring to FIG. 5A, an exemplary integrated circuit 250 implementation of an improved network interface device comprises two analog front ends AFE$_A$, AFE$_B$ for two respective widebands. The exemplary integrated circuit 250 also comprises a logic element 226 configured to implement the different power line modem technologies (including DFE and MAC) and provide a digital interface to the next stage application 228 in the device.

The high band analog front end (AFE$_B$) contains high band converters 230, 232 and active interface electronics (i.e. a PGA 234 and line driver 236) and connects to the power line via a coupling unit along path 238. The low band analog front end (AFE$_A$) comprises low band converters 240, 242 and active interface electronics (i.e. a PGA 244 and line driver 246) and connects to the power line via a coupling unit along path 248. The exemplary integrated circuit 250 also comprises filters (not shown; see, e.g., filter 149 in FIGS. 4C-4F) coupled to the active interface electronics along the paths 238 and 248.

A digital representation of the signal to be sent on the low band and high band is produced in the logic element 226 and is present at interfaces 251, 252 to the analog front ends $AFE_A$, $AFE_B$.

Referring to FIG. 5B, in an alternative integrated circuit partition 300 of the integrated circuit implementation of the improved network interface device, comprising two integrated circuits, namely a digital modem integrated circuit 302 and an analog modem integrated circuit 304 containing the two analog front ends $AFE_A$, $AFE_B$. The analog modem integrated circuit 304 may comprise several separate integrated circuits, for example each analog front end can be a separate integrated circuit as illustrated in FIG. 5B, or alternatively the analog modem integrated circuit 304 may be implemented as a single integrated circuit.

Referring to FIG. 5C, in another integrated circuit partition 400 of the integrated circuit implementation of the improved network interface device, the analog front end of each wideband is split into data converters $Conv_A$, $Conv_B$ and interface circuits $I/Face_A$, $I/Face_B$. In this case, the converters $Conv_A$, $Conv_B$ are integrated with the digital logic 401 of the power line modem in one integrated circuit 402 while the higher frequency current/voltage interface circuitry is provided in another integrated circuit 404.

It will be appreciated that there are numerous other possibilities including the embedding of all or part of the active electronics within other devices in the system, or the use of discrete blocks for various blocks.

Figure 6A:
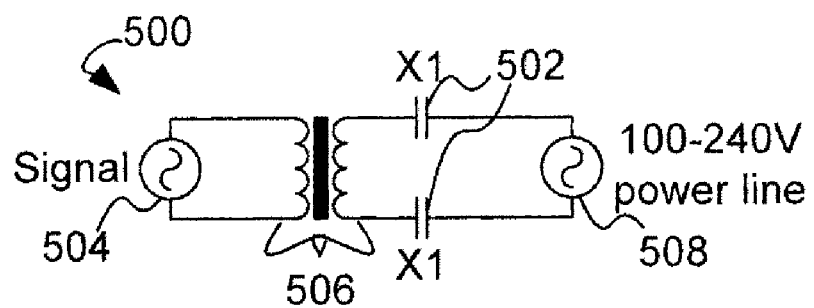
FIG. 6A is a circuit diagram of an exemplary capacitive coupling unit used in the power line communication device, according to various embodiments.

As discussed elsewhere herein, a coupling unit can have frequency characteristics. Referring to FIG. 6A, a capacitive coupling unit 500 comprises X1 type capacitors 502 that are used to couple a signal source 504 (via an isolating transformer 506) onto a power line 508. In this case, the impedances of the transformer 506, capacitors 502, signal source 504 and the power line 508 determine the frequency response of the capacitive coupling unit 500.

Figure 6B:
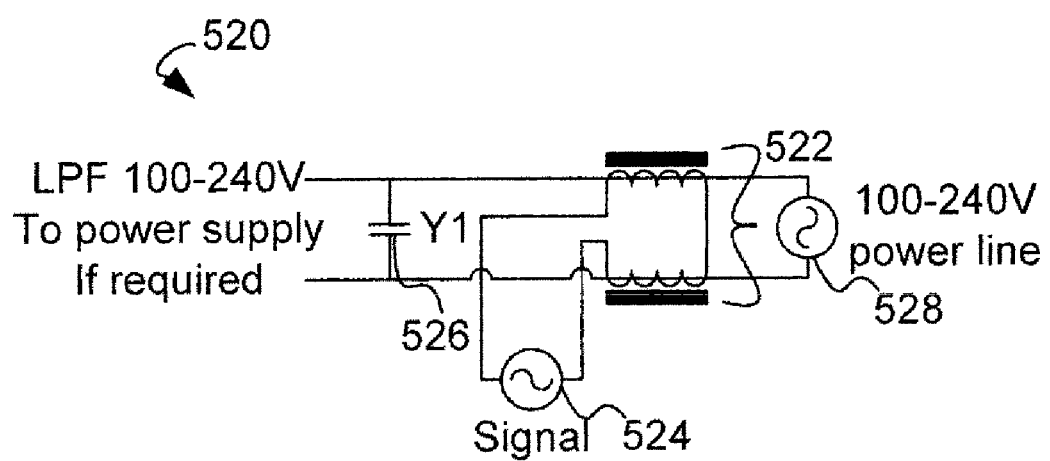
FIG. 6B is a circuit diagram of an exemplary inductive coupling unit used in the power line communication device, according to various embodiments.

Referring to FIG. 6B, an inductive coupling unit 520 comprises a signal transformer 522 that inductively couples a signal 524 in tandem with a Y1 type capacitor 526. The inductive coupling unit 520 is roughly equivalent to the capacitive coupling unit 500 (depicted in FIG. 6A), with the respective impedances of the transformer 522, capacitor 526, signal source 524 and power line 528 determining the frequency response of the inductive coupling unit 520.

Furthermore, a low-pass filtered version of the power line 508, 528 can be used within the improved network interface device to provide a power supply. It is also possible to implement higher order filters in the coupling units with more passive components. Nonetheless, it will be appreciated that it is possible to employ many other types of coupling unit (e.g. optical coupling units) in the power line network interface device.

Figure 7A:
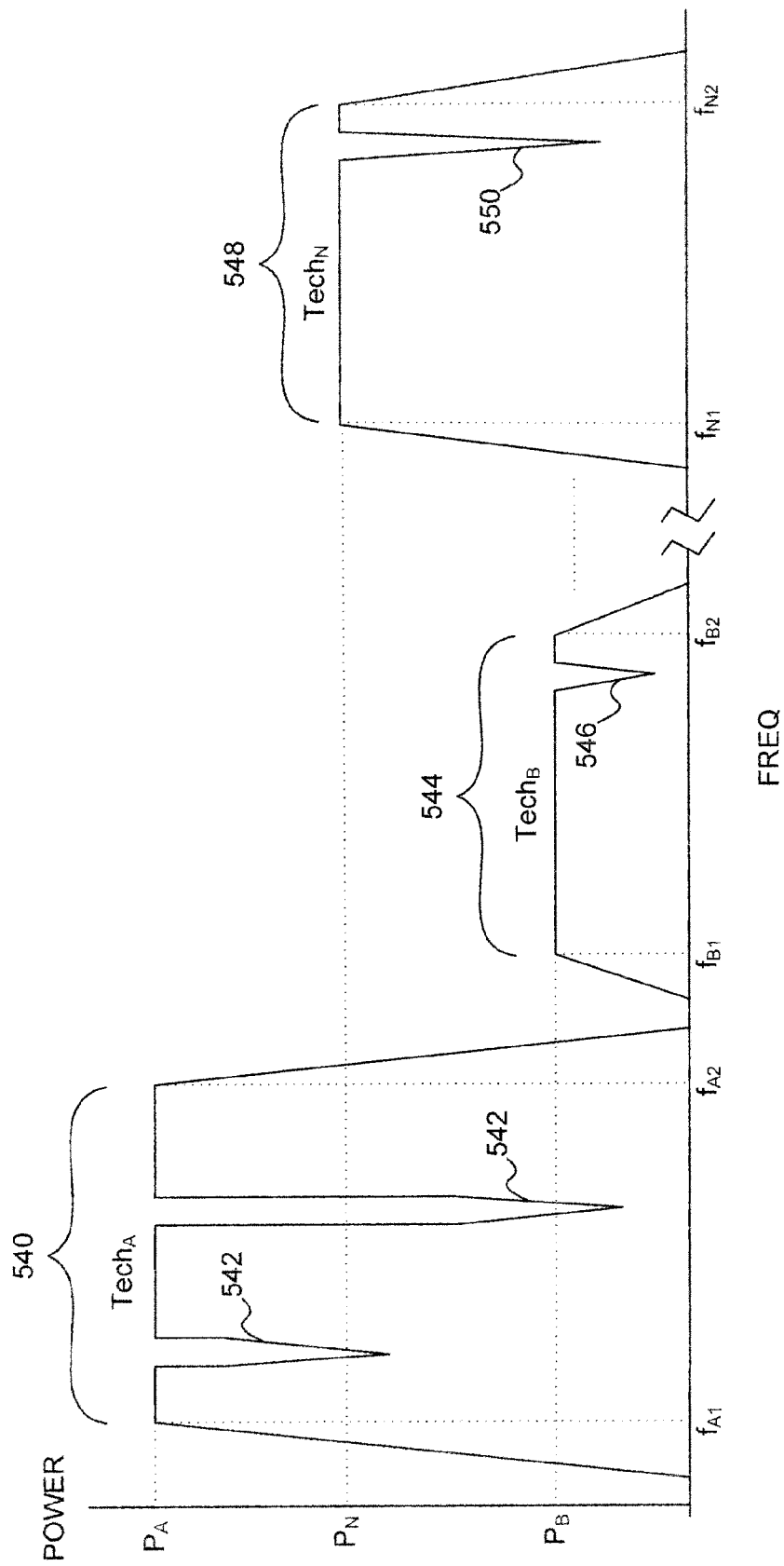
FIG. 7A is an exemplary power transmission spectrum of three power line technologies, according to various embodiments.
Figure 7B:
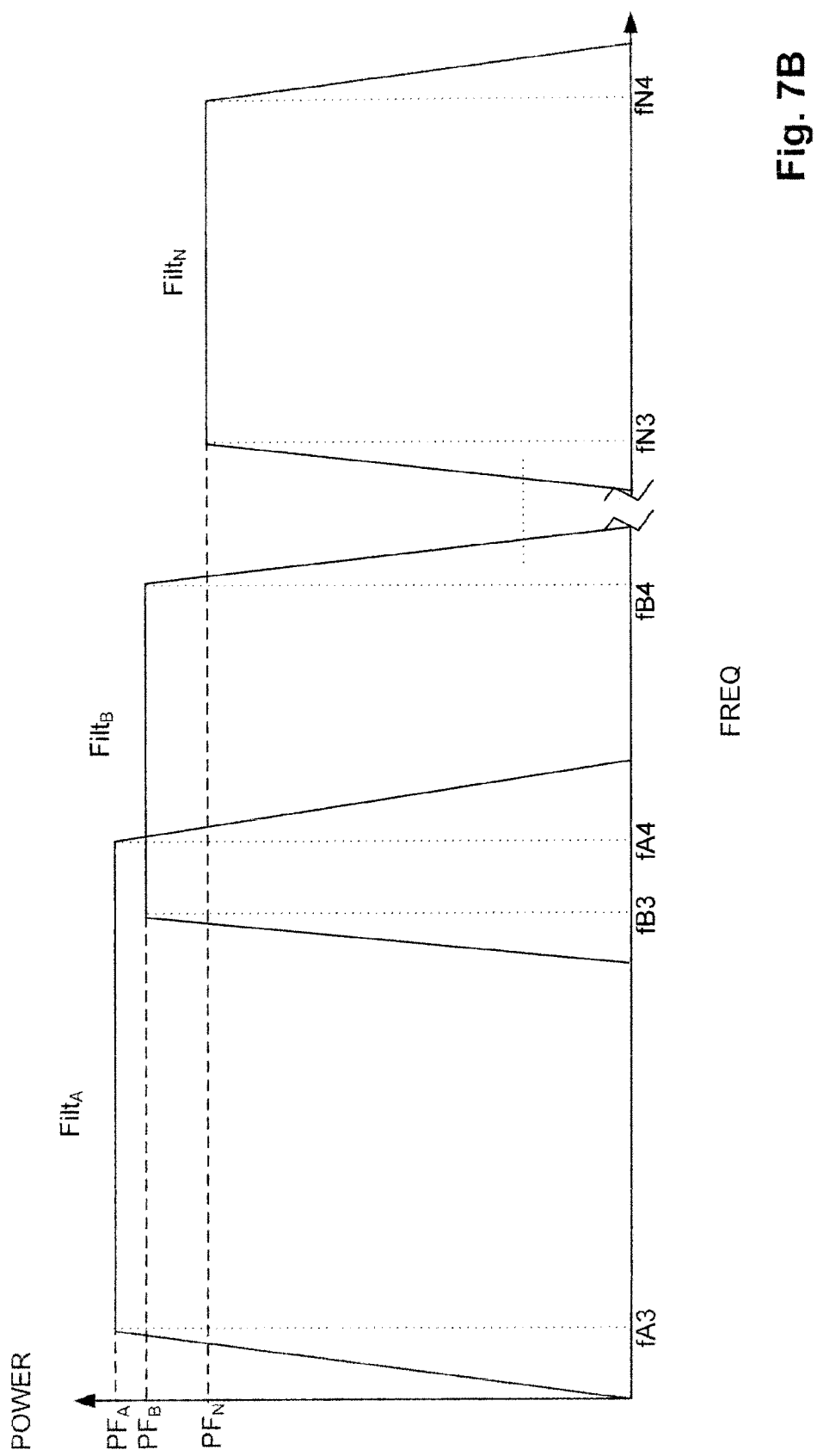
FIG. 7B depicts the frequency characteristics of an exemplary set of analog filters for use in separating the widebands used by the three power line technologies depicted in FIG. 7A, according to various embodiments.

FIGS. 7A to 7C illustrate exemplary frequency spectra of a number of different power line technologies, and demonstrate how an analog signal separating device could be used to separate the signals of a given technology (from the signals of the other technologies) into a particular signal path.

Referring to FIG. 7A, a first technology $Tech_A$ has a transmission power $P_A$ and a wide-band 540 delimited by frequencies $f_{A1}$ and $f_{A2}$. The wide-band 540 has internal notches 542 to comply with EMC (Electromagnetic Compatibility) regulations. A second technology $Tech_B$ has a transmission power of $P_B$ and a wide-band 544 delimited by frequencies $f_{B1}$ and $f_{B2}$. The wide-band 544 also has a notch 546 to comply with EMC regulations. It should be noted that $f_{B1}$ may be greater than $f_{A2}$ to avoid band-overlapping. Finally, a third technology $Tech_N$, has transmission power $P_N$ and a wide-band 548 delimited by frequencies $f_{N1}$ and $f_{N2}$. The wide-band 548 also has a notch 550 to comply with regulations.

Referring to FIG. 7B a first, second and third analog filter (namely $Filt_A$, $Filt_B$ and $Filt_N$ respectively) respectively isolate the signals from each of $Tech_A$, $Tech_B$ and $Tech_N$, from the signals from the other technologies. The analog filter characteristics are applicable to the transmitter and/or the receiver of each technology within a node.

The first analog filter $Filt_A$ is defined by passband start and end frequencies $f_{A3}$, $f_{A4}$. Similarly the second analog filter $Filt_B$ is defined by passband start and end frequencies $f_{B3}$ and $f_{B4}$. Finally, the third analog filter $Filt_N$ is defined by passband start and end frequencies $f_{N3}$ and $f_{N4}$.

In one embodiment, the start of at least one of the passbands of the analog signal separating device of the power line communication device is between 1 MHz and 30 MHz, and is at least 10 MHz in width. Optionally, at least one of the other widebands includes signals at a frequency greater than 30, 40, 50, 75, 100, 200 or 500 MHz, and optionally less than 1 GHz. The difference between the passband and stopband for any one of the elements of the analog signal separating device may be more than 6 dB.

It should be noted that it is possible for different analog filters to overlap (e.g. $f_{A4} > f_{B3}$) as shown in FIG. 7B, or not to overlap (e.g. $f_{B4} < f_{N3}$). It should also be noted that it is not necessary for the passbands of all of the analog filters to have the same characteristics (like attenuation or losses inside the band, ripple inside the band, attenuation rejection at frequencies outside the band or others). The combination of the analog filter characteristic and the modulation scheme of a given PLC technology determines the effectiveness of the isolation by each analog filter. The absolute losses of the filters inside their respective passbands is less important than the ratio of passband to stopband, as any attenuation differences in these filters can often be compensated for with more injected power at the pre-filter stage and/or increased receiver sensitivity.

FIG. 7C shows an example of the isolation provided by the second analog filter $Filt_B$ to the $Tech_B$ signal. In use, the second analog filter passes a signal $Path_B$ that is the product of the transmission power ($PF_B$) of the passband of the second analog filter and the transmission power ($P_B$) of the $Tech_B$ signal. The signals of the other technologies ($Tech_A$ and $Tech_N$) are attenuated by the stopband attenuation of $Filt_B$ to a power level $PF_N$ that is sufficiently less than $PF_B$ to ensure that they do not significantly interfere with the $Path_B$ signal.

In some embodiments, the improved power line communication network includes the ability to provide increased throughput as the number of nodes increase in the network. In particular, such increased throughput demand typically coincides with an increased number of nodes, since more data needs to be transmitted when multiple devices share the network.

Figure 8A:
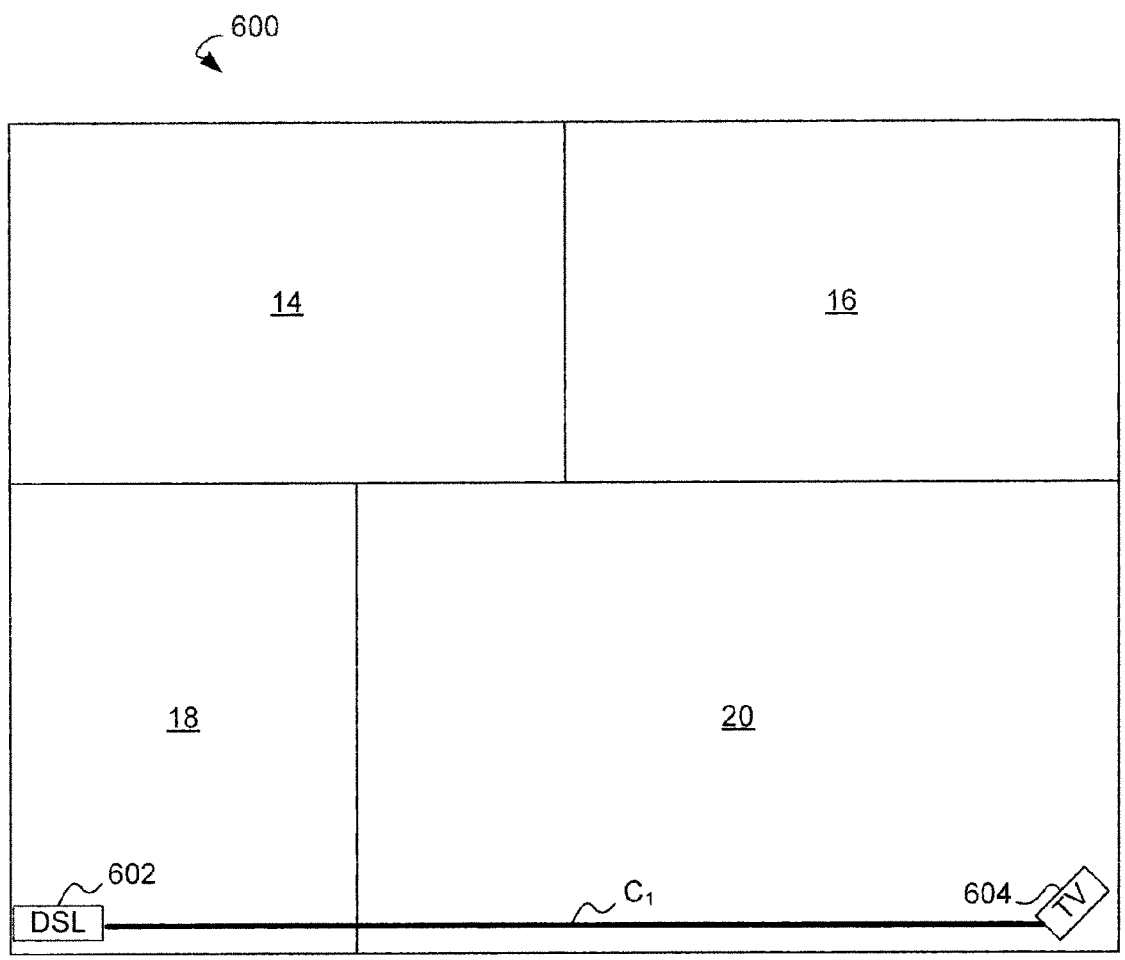
FIG. 8A is a block diagram of a household with a simple initial installation of the power line communication network of the third aspect of the invention, according to various embodiments.

FIG. 8A shows a simple initial installation of a single service, in this case IPTV (internet protocol television) delivered to the home 600 via a DSL modem 602, which is distributed (using the improved power line communication network) from the DSL modem 602 in room 18 to a TV set 604 in room 20. Since the distance between the DSL modem 602 and the TV set 604 is comparatively long, the connection C1 therebetween predominantly uses the low band due to its inherently greater coverage. The bandwidth provided by the low band is sufficient for the TV set because only a single TV channel is transmitted.

Figure 8B:
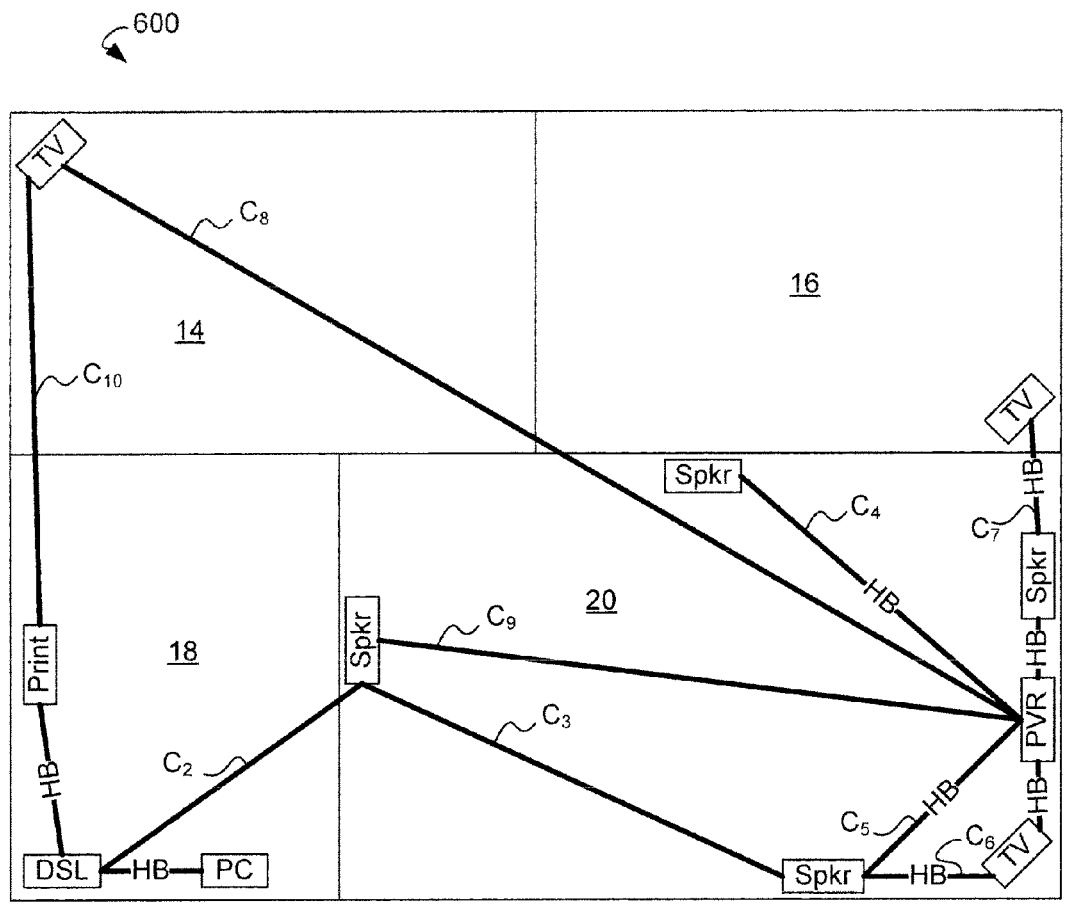
FIG. 8B is a block diagram of a household with a more complex installation of the power line communication network, according to various embodiments.

As an improved power line communication network grows (i.e. more nodes are added to it) the average distances between nodes tends to decrease. When a very complex situation is installed like that depicted in FIG. 8B (showing a complex in-home multimedia network with multiple simultaneous video and audio streams), connections C2-C7 are predominantly implemented using the high band (due to its greater throughput) over the relatively short distances present. Low band connections C8, C9, will still be in use when their efficiency is higher than using multiple hops of high band links. In addition, many connections (e.g. C10) will be served by communication using both bands.

In use, a node on the network will typically discover the other nodes on the power line through some form of synchronization that is usually defined within the power line technology used in one of the bands. The node will also identify the technology capabilities and virtual network membership of the detected nodes, to determine what communication will be possible and/or allowable (for instance, whilst a detected node may physically have certain technology capabilities, these may be impaired by interference or restricted in use). Having identified the physically possible and allowable communications, the sending node will decide the best path for sending/receiving data, based on factors such as the type of data to be communicated, how it is ranked in the QoS (quality of service), the traffic load and the available channel capacity.

Figures 9, 10:
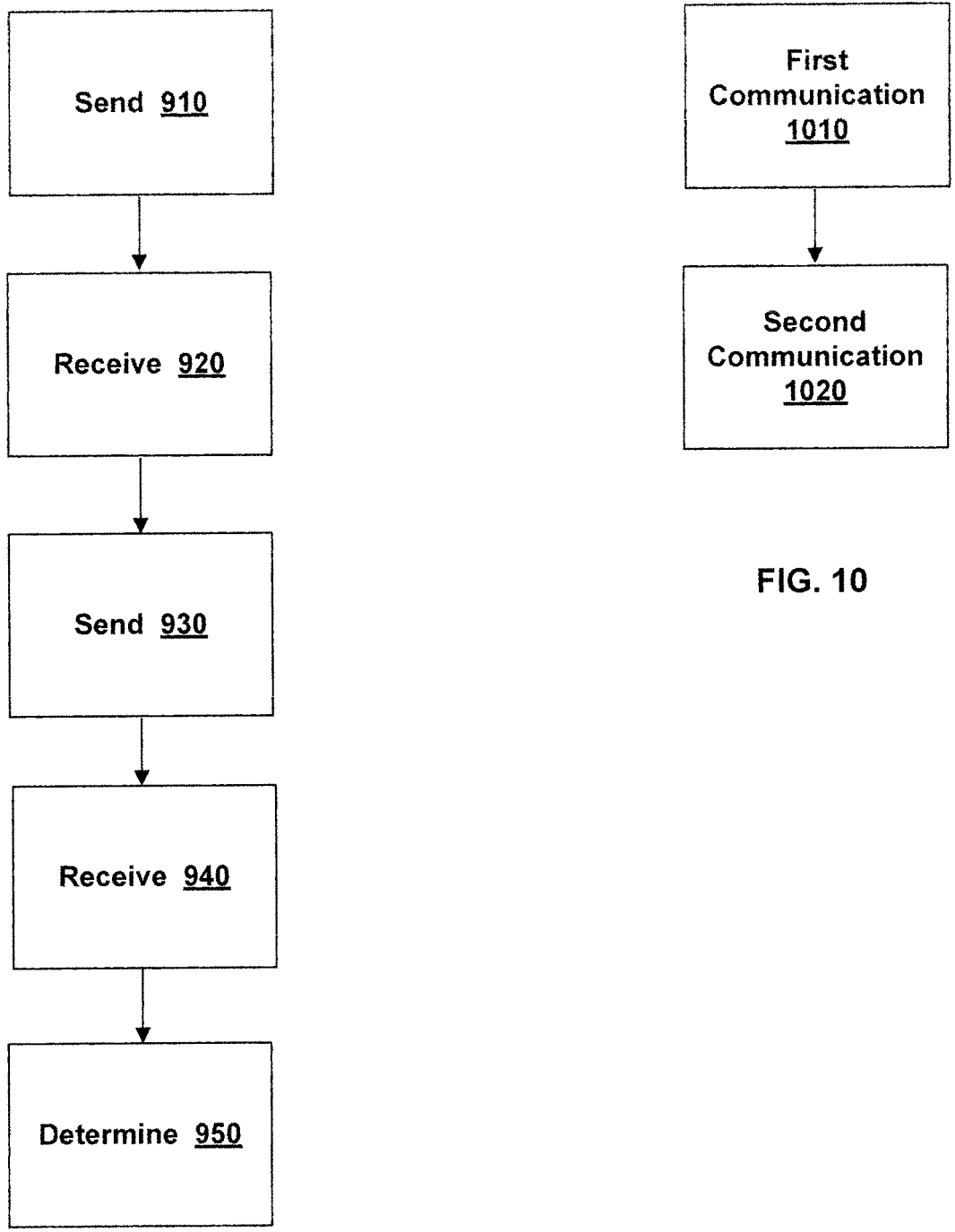
FIG. 9 illustrates a method by which one communication node can discover other communication nodes on a network using different wideband frequency ranges, according to various embodiments.
FIG. 10 illustrates a method in which a first communication node communicates simultaneously with both a second communication node and a third communication node, according to various embodiments.

FIG. 9 illustrates a method by which one communication node can discover other communication nodes on a network using different wideband frequency ranges. FIG. 9 will be understood to be illustrating a method for establishing an ad-hoc peer-to-peer network where each communication node is a peer. This is contrasted to a master-slave network in which the slave nodes cannot communicate with one another except through the master. In the peer-to-peer network there is no need for a master node as each node can optionally communicate with every other node either directly, or through a third node acting as a repeater.

In a send step 910, a first communication is sent from a first communication node over a power line using a first wideband frequency range, the first communication including data configured to identify a second communication node configured to communicate in the first wideband frequency range. For example, the first communication can be a message that is configured to solicit a response from other communication nodes, such as the second communication node, that are also configured to communicate over the first wideband frequency.

In a receive step 920, another communication, responsive to the first communication, is received from the second communication node. This response can indicate that the second node is joining the network, for instance.

In a send step 930, a second communication is sent from the first communication node over the power line using a second wideband frequency range, the second communication including data configured to identify a third communication node configured to communicate in the second wideband frequency range. This second communication is configured to solicit a response from other communication nodes, such as the third communication node, that are configured to communicate over the second wideband frequency. Steps 910 and 930 are the same, other than that each applies to a different band used to communicate over the power line. Steps 910 and 930 are performed independently of one another, by the first communication node, such that either step can precede the other, or both steps can be performed simultaneously.

In a receive step 940, a response to the second communication is received from the third communication node. If the second communication node is further configured to communicate using the second wideband, then receive step 940 may include receiving communications from both the second and third communication nodes.

In a determine step 950, a communication strategy is determined based on the response to the first communication and the response to the second communication. This determination may include selections of widebands or standards to use. This determination may include a strategy for communication between the third and second communication nodes, e.g., should the communication be direct or should the first communication node function as a relay. In some embodiments, send steps 910 and 930 include using different standards in addition to, or as an alternative to, using different widebands.

In an optional communicate further step of the method a communication between two nodes is executed according to the communication strategy determined in step 950.

FIG. 10 illustrates a method in which a first communication node communicates simultaneously with both a second communication node and a third communication node in a peer-to-peer network. The communication is optionally independent. The first communication node optionally operates as a relay between the second communication node and the third communication node.

In a first communication step 1010, first data is communicated between a first communication node and a second communication node over a power line, using a first wideband frequency range. In a second communication step 1020, second data is communicated between the first communication node and a third communication node over the power line, using a second wideband frequency range separate from the first wideband frequency range, the first data and the second data being communicated simultaneously.

In a method that is analogous to that illustrated in FIG. 10 a first communication node communicates simultaneously with a second communication node over two or more separate widebands. In some of these embodiments the communications over the separate widebands are independent, while in other embodiments the communications are dependent. In these latter embodiments a first part of the data can be sent using a first wideband and a second part of data can be sent using a second wideband. In these embodiments, the use of the two different widebands is optionally configured to maximize total data bandwidth.

Figure 11:
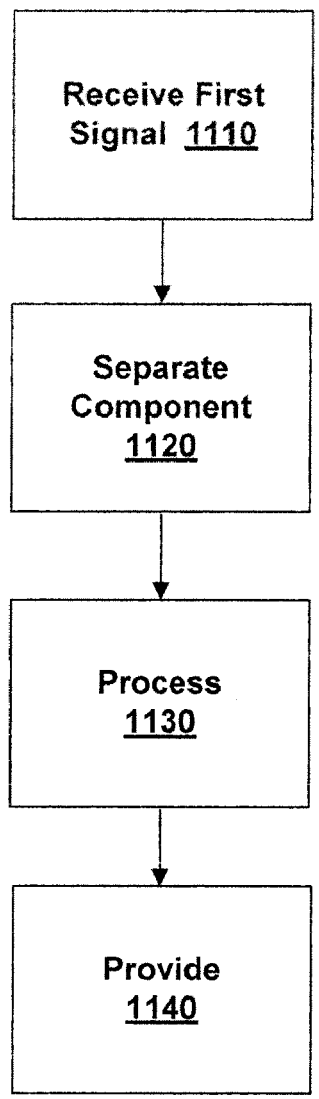
FIG. 11 illustrates a method in which a communication node receives simultaneous signals using at least two different widebands, according to various embodiments.

FIG. 11 illustrates a method in which a communication node receives simultaneous signals using at least two different widebands. Data encoded in these signals is optionally independent and may be received from different communication nodes on a network. The data may also be transmitted and/or decoded using different communication standards.

In a receive first signal step 1110, an analog signal is received over a power line. This signal includes encoded data. The encoding may include any of the various methods known for encoding data on a time dependent signal.

In a separate component step 1120, a first component of the signal, in a first wideband frequency range, is separated from a second component of the signal, in a second wideband frequency range. In various embodiments, each of the first wideband frequency range and the second wideband frequency range are at least 5, 7, 10, 12, 15, 20, 50, 100, and/or 200 MHz wide. For example in one embodiment, the first wideband frequency range is at least 10 MHz wide and the second wideband frequency range is at least 5 MHz wide. In one embodiment, the first wideband frequency range is at least 10 MHz wide and the second wideband frequency range is at least 200 MHz wide. In some embodiments, the separation of signal components is performed using analog bandpass filters. For example, one bandpass filter may be configured to isolate the first wideband frequency range and another bandpass filter may be configured to isolate the second wideband frequency range.

In a process step 1130, the first signal component and the second signal component, separated in separate component step 1120, are each separately processed. This processing is typically preformed in parallel. For example, one signal component may be processed using low band analog path $LB_1$ and the other signal component may be processed using high band path $HB_1$. Low band analog path $LB_1$ and high band path $HB_1$ optionally share one or more component. Process step 1130 results in two sets of digital data.

In a provide step 1140, the two sets of digital data are provided to one or more applications. The two sets of digital data may be used independently.

Figure 12:
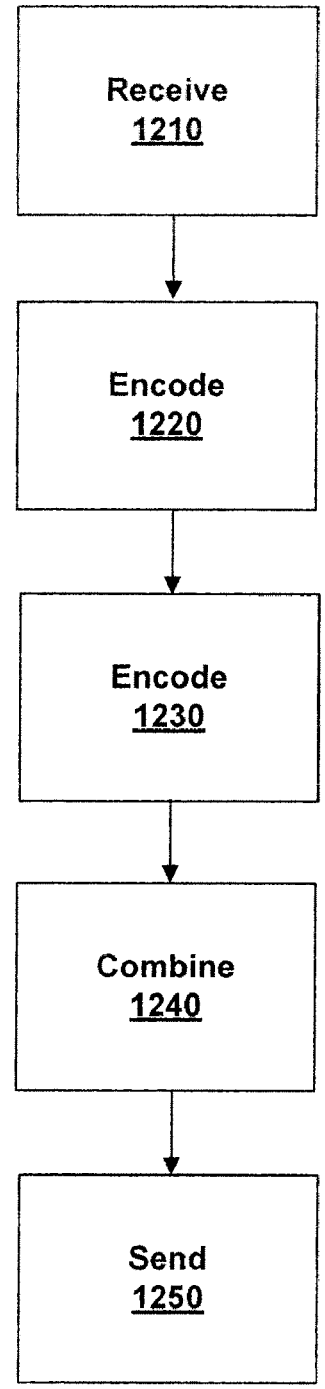
FIG. 12 illustrates a method in which a communication node sends simultaneous signals using at least two different widebands, according to various embodiments.

FIG. 12 illustrates a method in which a communication node sends simultaneous signals using at least two different widebands. Data encoded in these signals is optionally independent and may be intended for different communication nodes on a network. The data may be transmitted and/or encoded using different communication standards.

In a receive data step 1210, digital data is received from one or more applications. This data is optionally independent. In an encode step 1220, a first part of the digital data is encoded into a first signal within a first wideband frequency range, at least part of the first wideband frequency range is optionally less than 30 MHz. This encoding may be performed using, for example, low band analog path $LB_2$.

In an encode step 1230, a second part of the digital data is encoded into a second signal within a second wideband frequency range, at least part of the second wideband frequency range is optionally greater than 30 MHz. This encoding may be performed using, for example, high band path and $HB_2$. Encode Step 1230 and Encode Step 1220 may be performed in parallel.

In an optional combine step 1240, the first signal and the second signal are combined to generate a combined signal. This step is optionally performed using Tx Coupling 196, or HB Tx Coupling 154 and LB Tx Coupling 160. For example, using HB Tx Coupling 154 and LB Tx Coupling 160 the combination may occur as both signals are coupled to a power line.

In a send step 1250, the combined signal is sent over a power line. Different parts of the combined signal may be sent simultaneously and may be intended for different destinations. Alternatively, if step 1240 is omitted, then send step 1250 comprises combining the first and second signals on the power line, where different parts of the combined signal are sent simultaneously and may be intended for different destinations.

Several embodiments are specifically illustrated and/or described herein. However, it will be appreciated that modifications and variations are covered by the above teachings and within the scope of the appended claims without departing from the spirit and intended scope thereof. For example, the techniques described herein may be in used in household, industrial and/or vehicle power systems. Further various elements illustrated and discussed herein may be embodied in software (stored on computer readable media), firmware, and/or hardware. These element forms are generally referred to herein as "logic."

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A network interface device comprising:
   a first block including a first Physical (PHY) layer in communication with a first Media Access Control (MAC) layer, the first block configured to implement a first wideband communication technology associated with a first wideband frequency range;
   a second block including a second PHY layer in communication with a second MAC layer, the second block configured to implement a second wideband communication technology associated with a second wideband frequency range that is separate from the first wideband frequency;
   a data distribution block in communication with the first and second MAC layers and configured to receive and distribute the data to the first and second blocks;
   a coupling/decoupling stage configured to couple signals within the first and second wideband frequency ranges onto an Alternating Current (AC) power line;
   a first analog passband filter disposed between the first PHY layer and the coupling/decoupling stage and configured to attenuate signals with frequencies outside of the first wideband frequency range; and
   a second analog passband filter disposed between the second PHY layer and the coupling/decoupling stage and configured to attenuate signals with frequencies outside of the second wideband frequency range.

2. The network interface device of claim 1 wherein the data distribution block is configured to distribute the data to the first and second blocks based on network traffic characteristics.

3. The network interface device of claim 1 wherein the data distribution block is configured to distribute the data to the first and second blocks based on the respective channel capacities of the first and second wideband frequency ranges.

4. The network interface device of claim 1 wherein the data distribution block is configured to distribute the data to the first and second blocks based on feedback from the first and second PHY layers.

5. The network interface device of claim 1 wherein the data distribution block is configured to distribute the data to the first and second blocks based on a requirement for data transmission.

6. The network interface device of claim 5 wherein the requirement is a latency requirement.

7. The network interface device of claim 5 wherein the requirement is a quality of service requirement.

8. The network interface device of claim 1 wherein the first wideband frequency range comprises a first high band.

9. The network interface device of claim 8 wherein the second wideband frequency range comprises a second high band.

10. The network interface device of claim 1 wherein the first wideband frequency range is from 2 MHz to 30 MHz and the second wideband frequency range is from 50 MHz to 300 MHz.

11. The network interface device of claim 1 wherein the data distribution block is further configured to receive the data from a single application and distribute the data to the first and second blocks simultaneously.

12. The network interface device of claim 1 wherein the data distribution block is further configured to receive the data from two applications, to distribute data from the first application to the first block, and to distribute data from the second application to the second block, and wherein the data is distributed to the first and second blocks simultaneously.

13. The network interface device of claim 1 wherein the distribution block is further configured to
- receive the data from a single application and distribute the data to the first block and simultaneously
- receive other data from the second MAC layer and pass the other data to a second application.

14. The network interface device of claim 1 wherein the data distribution block is further configured to receive other data from the first MAC layer and the second MAC layer simultaneously, and pass the other data to a single application.

15. The network interface device of claim 1 further comprising
- a third block including a third PHY layer in communication with a third MAC layer, the third block configured to implement a third wideband communication technology associated with a third wideband frequency range, the third block being disposed between the data distribution block and the coupling/decoupling stage, and
- a third analog passband filter disposed between the third PHY layer and the coupling/decoupling stage and configured to attenuate signals with frequencies outside of the third wideband frequency range.

16. The network interface device of claim 15 wherein the data distribution block is further configured to
- receive the data from a first application and a second application and distribute data from the first application to the first block and simultaneously distribute data from the second application to the second block, and
- simultaneously receive other data from the third MAC layer and pass the other data to a third application.

17. The network interface device of claim 15 wherein the data distribution block is further configured to
- receive the data from a first application and simultaneously distribute the data to the first and second blocks, and
- simultaneously receive other data from the third MAC layer and pass the other data to a second application.

18. The network interface device of claim 15 wherein the data distribution block is further configured to receive the data from an application and simultaneously distribute the data to the first, second, and third blocks.

* * * * *